(12) United States Patent
Itoh et al.

(10) Patent No.: US 9,689,975 B2
(45) Date of Patent: Jun. 27, 2017

(54) RADAR APPARATUS

(71) Applicant: FUJITSU TEN LIMITED, Kobe-shi, Hyogo (JP)

(72) Inventors: Jun Itoh, Kobe (JP); Hiroyuki Ishimori, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 93 days.

(21) Appl. No.: 14/693,222

(22) Filed: Apr. 22, 2015

(65) Prior Publication Data
US 2015/0309169 A1 Oct. 29, 2015

(30) Foreign Application Priority Data
Apr. 25, 2014 (JP) .................. 2014-091104

(51) Int. Cl.
*G05D 1/00* (2006.01)
*G05D 3/00* (2006.01)
(Continued)

(52) U.S. Cl.
CPC ............. *G01S 13/04* (2013.01); *B60W 30/16* (2013.01); *G01S 7/41* (2013.01); *G01S 13/345* (2013.01);
(Continued)

(58) Field of Classification Search
CPC ....... B60W 30/16; B60W 30/09; G01S 13/04; G01S 13/34; G01S 13/345; G01S 13/723; G01S 13/726; G01S 13/88; G01S 13/931; G01S 7/41; G01S 7/412; G01S 2013/9375; G01S 2013/9321; G01S 2013/9346; G01S 2013/935; G01S 2013/9353; G01S 13/93; G01S 7/35
See application file for complete search history.

(56) References Cited

U.S. PATENT DOCUMENTS

| | | | | |
|---|---|---|---|---|
| 6,040,795 A | * | 3/2000 | Watanabe | G01S 13/931 342/70 |
| 6,067,038 A | * | 5/2000 | Uehara | G01S 13/34 342/109 |
| 2003/0218563 A1 | * | 11/2003 | Miyahara | G01S 13/723 342/70 |
| 2004/0150549 A1 | * | 8/2004 | Kumon | G01S 7/412 342/70 |

(Continued)

FOREIGN PATENT DOCUMENTS

| | | |
|---|---|---|
| JP | 2000-057500 A | 2/2000 |
| JP | 2002-372584 A | 12/2002 |

(Continued)

*Primary Examiner* — Rachid Bendidi
(74) *Attorney, Agent, or Firm* — Oliff PLC

(57) ABSTRACT

A radar apparatus is configured to set a first target to be a non-output object with respect to a control apparatus of a host vehicle in a case where the first target (1) has a fore-and-aft distance from the host vehicle that is larger than a fore-and-aft distance from the host vehicle of a second target and (2) has a predetermined dependency to be an accessory portion which belongs to a same vehicle as the second target. The radar apparatus includes a signal processor configured to: determine whether or not the second target is present in an own lane of the host vehicle; determine whether or not the second target is changing a lane; and set the first target to be an output object with respect to the control apparatus of the host vehicle in a case where the second target is changing the lane from the own lane.

7 Claims, 14 Drawing Sheets

(51) Int. Cl.
*G06F 7/00* (2006.01)
*G06F 17/00* (2006.01)
*G01S 13/04* (2006.01)
*B60W 30/16* (2012.01)
*G01S 13/88* (2006.01)
*G01S 7/41* (2006.01)
*G01S 13/34* (2006.01)
*G01S 13/72* (2006.01)
*G01S 13/93* (2006.01)

(52) U.S. Cl.
CPC ............ *G01S 13/726* (2013.01); *G01S 13/88* (2013.01); *G01S 13/931* (2013.01); *G01S 2013/935* (2013.01); *G01S 2013/9321* (2013.01); *G01S 2013/9346* (2013.01); *G01S 2013/9353* (2013.01); *G01S 2013/9375* (2013.01)

(56) References Cited

U.S. PATENT DOCUMENTS

| | | | |
|---|---|---|---|
| 2010/0106418 A1* | 4/2010 | Kindo | B60W 40/072 701/300 |
| 2011/0285574 A1* | 11/2011 | Tsunekawa | G01S 7/40 342/70 |
| 2012/0166017 A1* | 6/2012 | Kobayashi | B60T 7/22 701/1 |
| 2012/0200450 A1* | 8/2012 | Ishimori | G01S 13/931 342/70 |
| 2015/0112509 A1* | 4/2015 | Fujita | G08G 1/166 701/1 |
| 2016/0221575 A1* | 8/2016 | Posch | B60W 50/0098 |

FOREIGN PATENT DOCUMENTS

| | | |
|---|---|---|
| JP | 2009-211212 A | 9/2009 |
| JP | 2012-163442 A | 8/2012 |

\* cited by examiner

Fig.10

| COUNTER OPERATING CONDITION | COUNTER OPERATION CONTENT |
|---|---|
| (a) \|RELATIVE LATERAL DISTANCE\| ≤ 1.8 M | OWN LANE COUNTER INCREMENT |
| (b) \|RELATIVE LATERAL DISTANCE\| ≥ 3.3 M | OWNLANE CHANGE COUNTER INCREMENT |
| (c) LANE CHANGE COUNTER ≥ 5 CNT | LANE COUNTER CLEAR |
| (d) \|RELATIVE LATERAL DISTANCE\| < 3.3 M | LANE CHANGE COUNTER CLEAR |
| (e) NOT DETECTED OR DETECTED ANEW | BOTH COUNTERS CLEAR |
| (f) OTHER THAN (a) TO (e) | BOTH COUNTERS HOLD |

RADAR APPARATUS

BACKGROUND OF THE INVENTION

Field of the Invention

The present invention relates to a signal processing for detecting a target.

Description of the Background Art

In the related art, a radar apparatus provided on a vehicle detects a target in the periphery of the vehicle, and outputs target information of the target to a vehicle control apparatus. The vehicle control apparatus uses the target information acquired from the radar apparatus and causes the vehicle to follow a preceding vehicle while repeating acceleration and deceleration so as to maintain a distance from the preceding vehicle constant. A vehicle control system functions as a system having the radar apparatus and the vehicle control apparatus and causing the vehicle to follow the preceding vehicle.

However, when an adjacent vehicle in a lane next to an own lane travels on a side closer to the own lane, part other than the vehicle body of the adjacent vehicle (for example, a side mirror) may enter the own lane. The adjacent vehicle is a vehicle to travel in an adjacent lane, which is adjacent to the own lane, and for example, a vehicle having a relatively large vehicle body such as a truck. Therefore, the radar apparatus may detect the part other than the vehicle body of the adjacent vehicle (hereinafter, referred to as an "accessory portion") as a target present in the own lane. Consequently, the vehicle control apparatus may perform vehicle control with respect to the vehicle that a user of the vehicle does not intend to with the accessory portion present in the adjacent lane as a follow-up object.

Therefore, the radar apparatus of the related art performs a process of determining whether the detected target is a target of the accessory portion such as the side mirror (hereinafter, referred to as a "mirror determination process"). When the radar apparatus determines the target to be the target of the accessory portion, the target is determined as a non-follow-up object and an output of the target information on the target in question to the vehicle control apparatus is not performed. Accordingly, the vehicle control apparatus performs the control of the vehicle aiming at a preceding vehicle within the own lane as a follow-up target without aiming at the accessory portion of the vehicle present in the adjacent lane as the follow-up object.

When there are a preceding vehicle and a pre-preceding vehicle, the radar apparatus may detect the respective targets. The pre-preceding vehicle is a vehicle present in the own lane, and is a vehicle present in front of the preceding vehicle. In other words, the pre-preceding vehicle is a vehicle at a distance from the vehicle longer than from the preceding vehicle.

When the targets of the preceding vehicle and the pre-preceding vehicle are being detected respectively, if the preceding vehicle changes a lane, the radar apparatus may determine the target of the pre-preceding vehicle as the target of the accessory portion by the mirror determination process.

If the preceding vehicle changes the lane from the own lane to the adjacent lane, the vehicle control apparatus acquires target information of the pre-preceding vehicle from the radar apparatus, and changing the follow-up object from the preceding vehicle to the pre-preceding vehicle. However, if the radar apparatus determines that the pre-preceding vehicle is the target of the accessory portion by the mirror determination process, an output of the target information of the pre-preceding vehicle to the vehicle control apparatus is not performed. Therefore, the vehicle control apparatus cannot acquire the target information of the pre-preceding vehicle even though the pre-preceding vehicle, which becomes in turn the preceding vehicle is actually present in front of the vehicle. Consequently, the vehicle control apparatus may determine that no follow-up object is present in front of the vehicle, and perform inadequate control on the vehicle such as accelerating the vehicle until the target information as another follow-up object is acquired from the radar apparatus.

SUMMARY OF THE INVENTION

According to an aspect of the invention, a radar apparatus is configured to set a first target to be a non-output object with respect to a control apparatus of a host vehicle in a case where the first target (1) has a fore-and-aft distance from the host vehicle that is larger than a fore-and-aft distance from the host vehicle of a second target and (2) has a predetermined dependency to be an accessory portion which belongs to a same vehicle as the second target. The radar apparatus includes a signal processor configured to: determine whether or not the second target is present in an own lane of the host vehicle; determine whether or not the second target is changing a lane; and set the first target to be an output object with respect to the control apparatus of the host vehicle in a case where the second target is changing the lane from the own lane.

Accordingly, the radar apparatus is capable of determining whether or not the target is the output object with respect to the control apparatus accurately, and hence is capable of outputting the target of the output object reliably to the control apparatus.

According to an aspect of the invention, in a case where a time during which (i) the fore-and-aft distance of the second target becomes a minimum among all sensed targets in the own lane and (ii) a lateral distance of the second target becomes a predetermined lateral distance or smaller, exceeds a predetermined time, the signal processor determines that the second target is present in the own lane.

Accordingly, the radar apparatus is capable of determining whether or not the first target is a target present at a position closest to the own lane within the own lane accurately, and is capable of reliably determining whether or not the second target is to be set to an output object with respect to the control apparatus.

Therefore, it is an object of the invention to provide a technology to detect a pre-preceding vehicle reliably when a preceding vehicle changes the lane in a state in which the preceding vehicle and the pre-preceding vehicle are present while preventing erroneous control due to an accessory portion of the vehicle.

These and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a drawing for explaining a specific example in which an output prohibiting flag is switched to ON;

FIG. 10 is a drawing for explaining operating conditions and operation contents of the respective counters;

DESCRIPTION OF THE EMBODIMENTS

Hereinafter, embodiments of the present invention will be described with reference to the drawings.

First Embodiment

1. System Block Diagram

Figure 1:
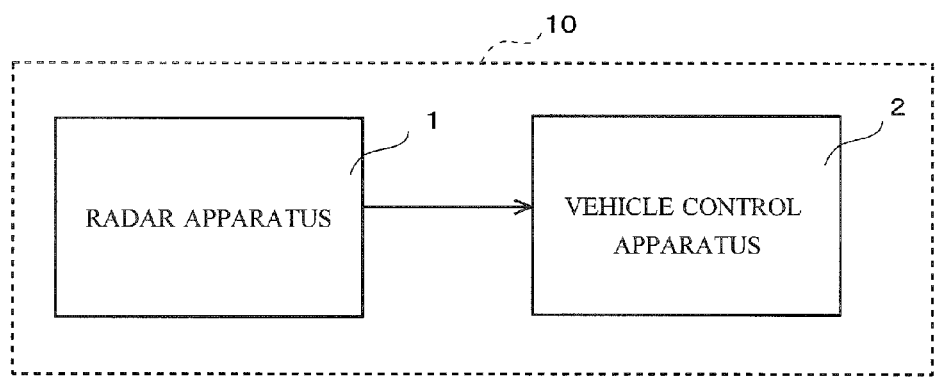
FIG. 1 is a drawing illustrating a configuration of a vehicle control system of an embodiment.

FIG. 1 is a drawing illustrating a configuration of a vehicle control system 10 of an embodiment. The vehicle control system 10 is mounted on a vehicle (host vehicle). As illustrated in the drawing, the vehicle control system 10 includes a radar apparatus 1 and a vehicle control apparatus 2.

The radar apparatus 1 of this embodiment detects a target present in the periphery of the vehicle by using an FM-CW (Frequency Modulated Continuous Wave), which is a continuous wave modulated in frequency thereof. The target has target information. The target information includes for example, a distance [m] that a reflected wave reflected from the target travels until being received by a receiving antenna of the radar apparatus 1 (hereinafter, referred to as a "fore-and-aft distance"), a relative speed [m/s] of the target with respect to the vehicle, and a distance [m] of the target in a lateral direction of the vehicle (vehicle width direction) (hereinafter, referred to as a "lateral distance").

The vehicle control apparatus 2 is connected to a brake and a throttle of the vehicle, acquires the target information output from the radar apparatus 1, and controls behaviors of the vehicle. Therefore, the vehicle control apparatus 2 may be said to be a data usage apparatus that uses the target information. For example, the vehicle control apparatus 2 uses the target information acquired from the radar apparatus 1 and causes the vehicle to follow a preceding vehicle while maintaining a distance from the preceding vehicle constant. Accordingly, the vehicle control system 10 of this embodiment functions as a preceding vehicle follow-up system.

2. Radar Apparatus Block Diagram

Figure 2:
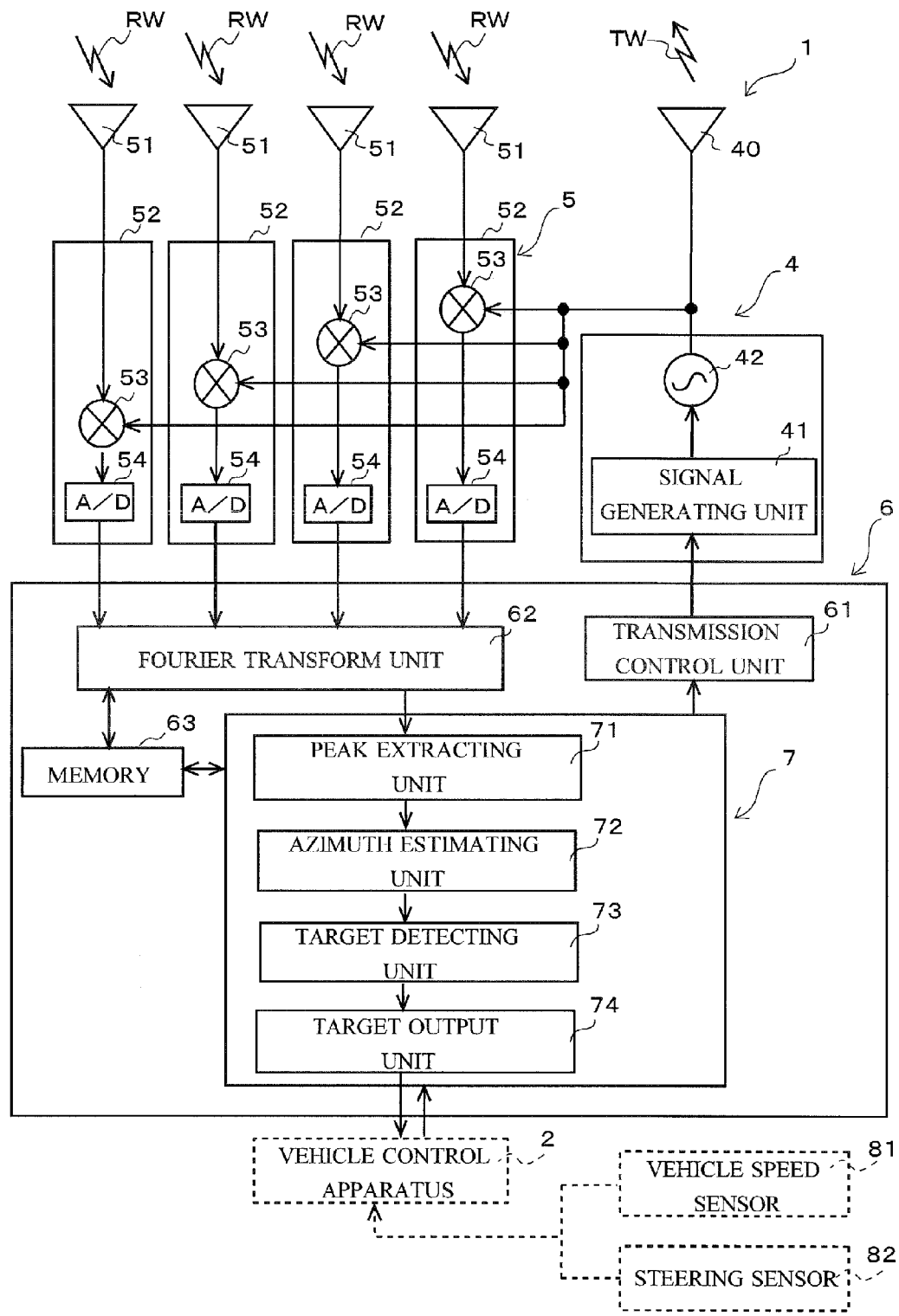
FIG. 2 is a drawing illustrating a configuration of a radar apparatus.

FIG. 2 is a drawing illustrating a configuration of the radar apparatus 1. The radar apparatus 1 is provided, for example, in a front bumper of the vehicle, and is configured to output a transmitting wave to an outside of the vehicle and receive a reflected wave from the target. The radar apparatus 1 is also provided mainly with a transmitting unit 4, a receiving unit 5, and a signal processing apparatus 6.

The transmitting unit 4 includes a signal generating unit 41 and an oscillator 42. The signal generating unit 41 generates a modulation signal in which a voltage varies in a triangle wave shape, and supplies the modulation signal to the oscillator 42. The oscillator 42 modulates the frequency of a signal of the continuous wave on the basis of the modulation signal generated by the signal generating unit 41, generates a transmitting signal in which the frequency varies in accordance with elapse of time, and outputs the transmitting signal to a transmitting antenna 40.

The transmitting antenna 40 outputs a transmitting wave TW to the outside of the vehicle on the basis of the transmitting signal from the oscillator 42. The transmitting wave TW output from the transmitting antenna 40 becomes FM-CW in which the frequency goes up and down at a predetermined cycle. The transmitting wave TW transmitted forward of the vehicle from the transmitting antenna 40 is reflected by the target such as the preceding vehicle, and becomes a reflected wave RW.

The receiving unit 5 includes a plurality of receiving antennas 51 that forms an array antenna, and a plurality of individual receiving units 52 connected to the plurality of receiving antennas 51. In this embodiment, the receiving unit 5 includes, for example, four of the receiving antennas 51 and four of the individual receiving units 52. The four individual receiving units 52 correspond to the four receiving antennas 51, respectively. Each of the receiving antennas 51 receives the reflected wave RW from the target, and processes the received signal obtained by the receiving antennas 51 corresponding to the each individual receiving units 52.

Each of the individual receiving units 52 includes a mixer 53 and an A/D converter 54. The received signal obtained from the reflected wave RW received by the receiving antenna 51 is amplified by a low noise amplifier (illustration is omitted) and is transmitted to the mixer 53. The transmitting signal from the oscillator 42 of the transmitting unit 4 is input to the mixer 53, and in the mixer 53, the transmitting signal and the received signal are mixed. Accordingly, a beat signal which indicates a beat frequency, which is a difference between the frequency of the transmitting signal and the frequency of the received signal, is generated. The beat signal generated by the mixer 53 is output to the signal processing apparatus 6 after having converted into a digital signal by the A/D converter 54.

The signal processing apparatus 6 is provided with a microcomputer including a CPU and a memory 63. The signal processing apparatus 6 records various data to be computed into the memory 63, which is a recording apparatus. The memory 63 is, for example, an RAM. The signal processing apparatus 6 includes a transmission control unit 61, a Fourier transform unit 62, and a data processing section 7 as functions to be implemented by software in the microcomputer. The transmission control unit 61 controls the signal generating unit 41 of the transmitting unit 4.

The Fourier transform unit 62 executes a fast Fourier transform (FFT) with respect to the beat signal output from the plurality of individual receiving units 52, respectively. Accordingly, the Fourier transform unit 62 transforms the beat signal relating to the respective receiving signals of the plurality of receiving antennas 51 into a frequency spectrum, which is data of a frequency region. The frequency spectrum obtained by the Fourier transform unit 62 is output to the data processing section 7.

The data processing section 7 detects the target on the basis of the frequency spectrum of the plurality of receiving antennas 51, respectively. The data processing section 7 outputs the target information of the target to the vehicle control apparatus 2. The data processing section 7 determines whether or not the target information is set to an output object with respect to the vehicle control apparatus 2 on the basis of a result of determination in the process of an output determination, described later. The process of the output determination will be described later.

Information from various sensors such as a vehicle speed sensor 81 and a steering sensor 82 provided on the vehicle is input to the data processing section 7 via the vehicle control apparatus 2. The data processing section 7 uses information such as a speed of the vehicle that the vehicle speed sensor 81 output to the vehicle control apparatus 2 and a steering angle of the vehicle that the steering sensor 82 outputs to the vehicle control apparatus 2 in the respective processes.

3. Detection of Target

Figure 3:
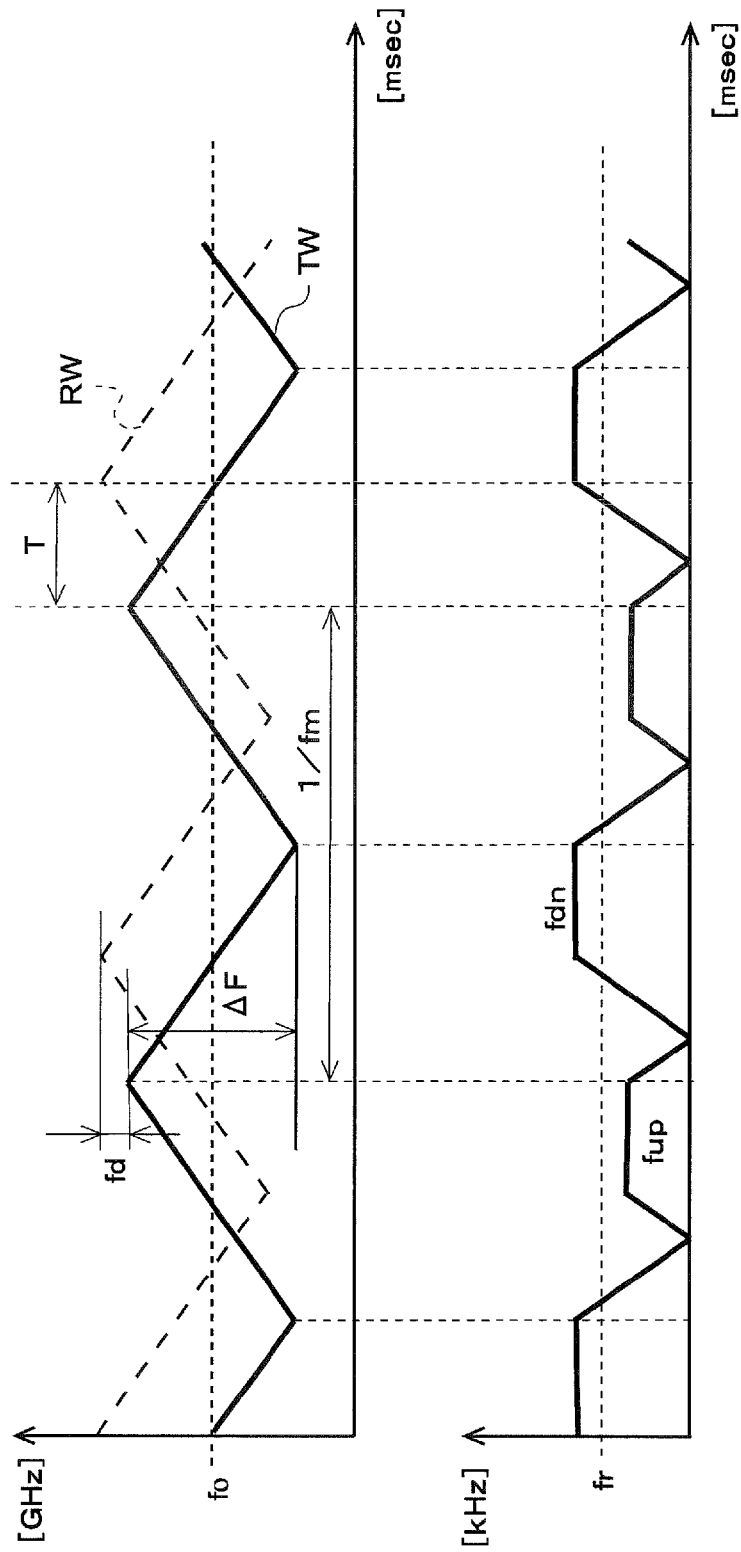
FIG. 3 is a drawing illustrating a relationship between a transmitting wave and a reflected wave.

Subsequently, a method (principle) of detection of the target by the radar apparatus 1 will be described. FIG. 3 is a drawing illustrating a relationship between a transmitting wave TW and a reflected wave RW. In order to simplify the description, the reflected wave RW illustrated in FIG. 3 is a reflected wave only from one ideal target. In FIG. 3, the transmitting wave TW is illustrated by a solid line, and the reflected wave RW is illustrated by a broken line. In the upper portion of FIG. 3, a lateral axis represents time [msec], and a vertical axis represents a frequency [GHz].

As illustrated in the drawing, the transmitting wave TW is a continuous wave whereof the frequency goes up and down at a predetermined cycle with respect to a predetermined frequency. The frequency of the transmitting wave TW changes linearly with respect to time. In the following description, a period in which the frequency of the transmitting wave TW increases is referred to as an "UP period", and a period in which the frequency of the transmitting wave TW decreases is referred to as a "DOWN period". A center frequency of the transmitting wave TW is defined as f0, a displacement width of the frequency of the transmitting wave TW is defined as ΔF, and a cycle that the frequency of the transmitting wave TW goes up and down is defined as 1/fm.

Since the reflected wave RW is the transmitting wave TW reflected from the target, the reflected wave RW is a continuous wave whereof the frequency goes up and down at a predetermined cycle with respect to the predetermined frequency in the same manner as the transmitting wave TW. However, the reflected wave RW has a time lag with respect to the transmitting wave TW by time T. The delayed time T corresponds to a distance (fore-and-aft distance) R of the target with respect to the vehicle, and is expressed by the following expression 1 where c is a light speed (the speed of the electric wave).

$$T = \frac{2 \times R}{c} \qquad \text{Expression 1}$$

A frequency shift of a frequency fd is generated in the reflected wave RW with respect to the transmitting wave TW due to a Doppler effect in accordance with a relative speed V of the target with respect to the vehicle.

In this manner, the frequency shift in accordance with the relative speed is generated in the reflected wave RW with a time lag with respect to the transmitting wave TW in accordance with the fore-and-aft distance. Therefore, as illustrated in the lower portion of FIG. 3, values of the beat frequency of the beat signal (the frequency of a difference between the frequency of the transmitting wave TW and the frequency of the reflected wave RW) are different in the UP period and the DOWN period. Hereinafter, the beat frequency in the UP period is defined as fup, and the beat frequency in the DOWN period is defined as fdn.

Here, if a beat frequency in the case where the relative speed of the target is 0 (zero) (if there is no frequency shift due to Doppler effect) is fr, the frequency fr is expressed by the following expression 2.

$$fr = \frac{fup + fdn}{c} \qquad \text{Expression 2}$$

The frequency fr takes a value in accordance with the delay time T described above. Therefore, a fore-and-aft distance R of the target can be obtained with the following Expression 3 by using the frequency fr.

$$R = \frac{c}{4 \times \Delta F \times fm} \times fr \qquad \text{Expression 3}$$

The frequency fd shifted by Doppler effect, is expressed by the following Expression 4.

$$fd = \frac{fup - fdn}{2} \qquad \text{Expression 4}$$

Therefore, the relative speed V of the target can be obtained by the following Expression 5 by using the frequency fd.

$$V = \frac{c}{2 \times f0} \times fd \qquad \text{Expression 5}$$

In the description given above, the fore-and-aft distance and the relative speed of one ideal target have been obtained. However, actually, the radar apparatus 1 receives the reflected waves RW from a plurality of targets simultaneously. Therefore, the frequency spectrum obtained by the Fourier transform unit 62 by applying the FFT process on the beat signal obtained from the received signal includes a target information corresponding respectively to the plurality of targets.

4. Process Flow Chart

Figure 4:
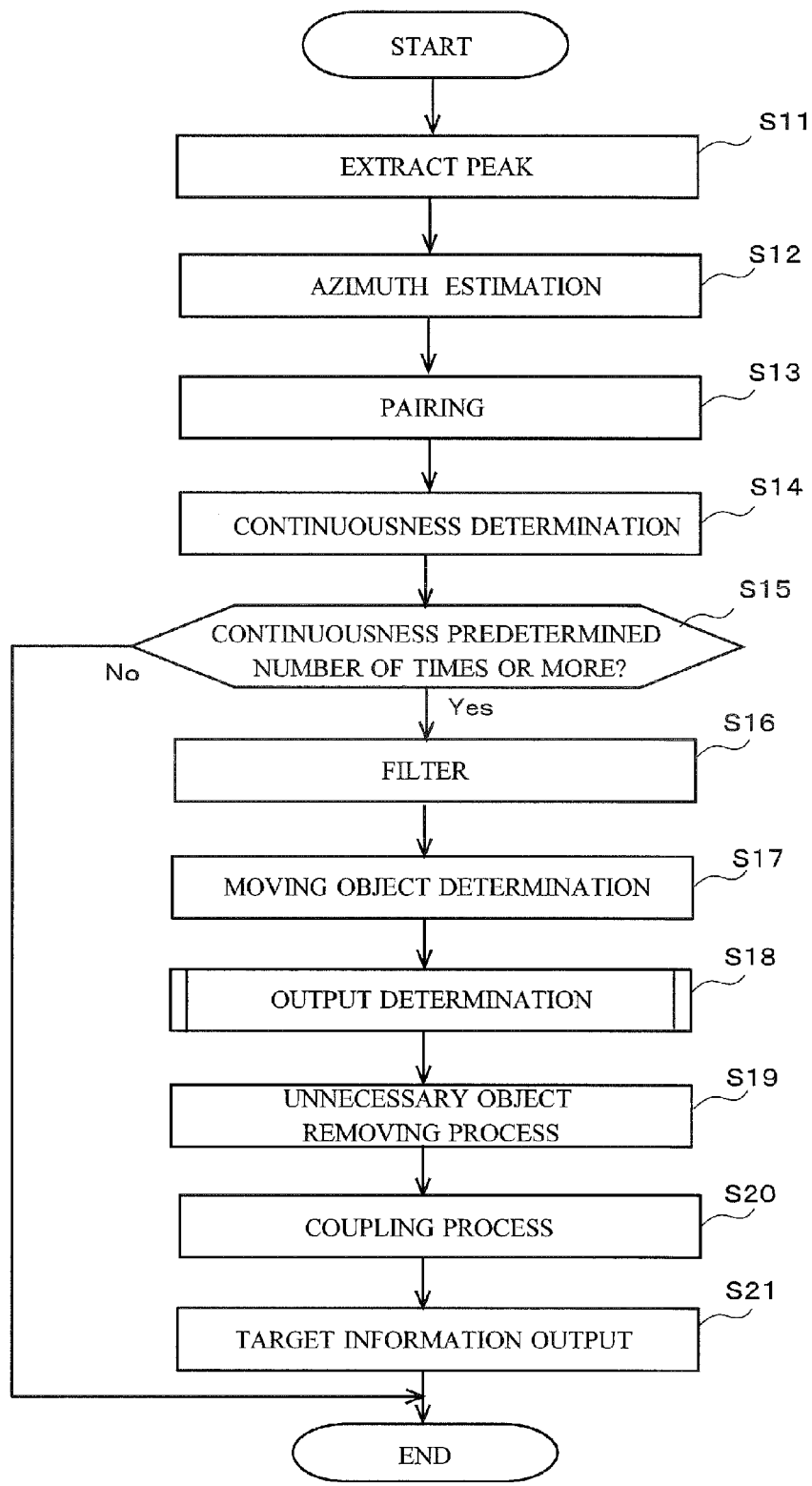
FIG. 4 is a drawing illustrating a flow of a target detection process.

Subsequently, a general flow of a target detection process performed by the data processing section 7 for the frequency spectrum after having subjected to the FFT process will be described. The target detection process is a process in which the data processing section 7 detects the target and outputs the target information of the target to the vehicle control apparatus 2. FIG. 4 is a drawing illustrating a flow of a target detection process. The data processing section 7 repeats the target detection process temporarily continuously at a predetermined temporal cycle (for example, a cycle of 1/20 second). At the starting point of the target detection process, the frequency spectrum in both the UP period and the DOWN period are input to the data processing section 7 from the Fourier transform unit 62 for all of the four receiving antennas 51.

First of all, a peak extracting unit 71 of the data processing section 7 extracts a signal of a signal level having a frequency exceeding a predetermined threshold value (peak signal) from among the frequency spectrums in the UP period and the DOWN period, respectively.

Subsequently, an azimuth estimating unit 72 estimates an angle of the target by performing an azimuth arithmetic processing using an ESPRIT on the peak signal. One peak signal may include the target information of a plurality of targets. Therefore, the azimuth estimating unit 72 estimates angles of the plurality of targets respectively from one peak signal by the azimuth arithmetic processing using the ESPRIT (Estimation of Signal Parameters via Rotational Invariance Techniques), for example (Step S12).

Subsequently, a target detecting unit 73 performs a pairing process which coordinate a peak signal in the UP period and a peak signal in the DOWN period in one-to-one correspondence on the basis of the reliability of the combination (Step S13). Specifically, the target detecting unit 73 calculates a "Mahalonobis' generalized distance", which is a reliability index of the combination of the peak signal by using a parameter value of the peak signal in the UP period (the angle and the angular power), and a parameter value of the peak signal in the DOWN period (angle and the angular power) by Expression 6

$$MD=(\theta d)^2 \times a + (\theta p)^2 \times b \qquad \text{Expression 6}$$

MD indicates the Mahalonobis' generalized distance. The reference sign θd indicates an angular difference between the angle of the peak signal in the UP period and the angle of the peak signal in the DOWN period. The reference sign θp indicates an angular power difference between the angular power of the peak signal in the UP period and the angular power of the peak signal in the DOWN period. Reference signs a and b are coefficients.

The target detecting unit 73 calculates the Mahalonobis' generalized distance MD on the basis of all of the combinations of the peak signals in the UP period and the peak signals in the DOWN period, and detects the combinations which provides a smallest value of the Mahalonobis' generalized distance MD as pair data. The target detecting unit 73 records the target information of the pair data (the fore-and-aft distance, the relative speed, and the lateral distance) in the memory 63.

The target detecting unit 73 may obtain the fore-and-aft distance R of the target by using Expression 2 and Expression 3 given above, and may obtain the relative speed V of the target by using Expression 4 and Expression 5 given above.

The target detecting unit 73 obtains an angle θ of the target by Expression 7 given below, where θup is an angle of the peak signal in the UP period and θdn is an angle of the peak signal in the DOWN period. The target detecting unit 73 is capable of obtaining the lateral distance of the target by arithmetic operation using a trigonometric function on the basis of the angle θ and the fore-and-aft distance R of the target.

$$\theta = \frac{\theta up + \theta dn}{2} \qquad \text{Expression 7}$$

Subsequently, the target detecting unit 73 determines a temporal continuousness between the pair data derived by the target detection process of this time (hereinafter, referred to as "the process of this time") and the pair data derived by the target detection process in the past (hereinafter, referred to as "the process in the past") (Step S14).

The target detecting unit 73 estimates the target information in the process of this time of the target relating to pair data in the process in the past. In this manner, the target detecting unit 73 derives pair data having estimated target information (hereinafter, referred to as "estimated pair data").

The target detecting unit 73 then selects one pair data having target information close to the estimated pair data from a plurality of pair data in the process of this time. The one pair data selected in this manner has a temporary continuousness with the pair data in the process in the past, and is determined as the pair data of the same target as the pair data of the process in the past.

The target detecting unit 73 determines the continuousness for all of the pair data in the process in the past stored in the memory 63. In such a determination, if pair data of the process of this time close to the parameter value of the estimated pair data does not exist, the estimated pair data is used as the pair data in the process of this time having the continuousness with the pair data in the process in the past. In this manner, a process of assuming the estimated pair data to be the pair data in the process of this time is referred to as an "extrapolating process".

The target detecting unit 73 determines pair data having no continuousness with the pair data in the process in the past and having not been subjected to the extrapolating process among the pair data in the process of this time as new pair data detected in the target detection process for the first time.

The target detecting unit 73 then determines whether or not the temporal continuousness between the pair data detected in the process of this time and the pair data detected in the process in the past continues by a predetermined number of times or more in a plurality of times of the target detection process (Step S15). If the continuousness of the pair data continues three times or more, for example (Yes in Step S15), the target detecting unit 73 performs a filter process which filters the target information of the pair data (Step S16).

The case where the continuousness continues three times means a case where pair data of the same target are continuously detected in three times of the target detection processes which are temporary continued. The three times of target detection processes temporary continued means, for example, pre-preceding and preceding target detection processes and the target detection process of this time. If the continuousness is smaller than three times (No in Step S15), after the completion of the process of this time, the data processing section 7 determines the number of times of the continuousness by the target detection process from the next time onward (hereinafter, referred to as the process from the next time onward).

In this manner, the data processing section 7 determines whether or not the pair data of the same target are derived continuously in a plurality of times of the target detection processes so as to prevent an output of an erroneous pair data to the vehicle control apparatus 2. The erroneous pair data is pair data generated by a wrong combination of the peak signal in the UP period and the peak signal in the DOWN period. Specifically, a combination of the peak signals corresponding to a reflection point at the same position of an object is pair data of the correct combination. In contrast, the combination of the peak signals corresponding to the reflecting points at different positions of the object is pair data of the wrong combination, that is, the erroneous pair data.

In the case where the pair data in the process in the past is the erroneous pair data, the pair data of the process of this time having the target information (for example, the fore-and-aft distance or the relative speed) close to the estimated pair data estimated from the erroneous pair data is not detected. Consequently, the extrapolating process is performed in the process of this time, and the extrapolating process continues in the process from the next time onward. The data processing section 7 deletes the target information of the erroneous pair data from the memory 63 by the extrapolating process continued by a predetermined number of times or more.

Subsequently, the target detecting unit 73 performs a filtering process on the pair data having the continuousness of a predetermined number of times or more (Step S16). In other words, the target detecting unit 73 smoothes the target information of the pair data in the direction of a time axis. Specifically, the target detecting unit 73 detects weighted average data of the target information of the pair data as an instantaneous value derived in the process of this time and the target information of the estimated pair data used in the continuousness determination process. This data is referred to as "filter data".

For example, the target detecting unit 73 lets 0.25 stand for a multiplier of the target information of the pair data derived in the process of this time, and 0.75 stand for a multiplier of the target information of the estimated pair data. The target information of the pair data as the instantaneous value may become an abnormal value due to the influence of noise or the like. However, becoming the abnormal value may be prevented by performing such a filtering process. The target detecting unit 73 records the target information of the filter data in the memory 63.

Subsequently, the target detecting unit 73 performs a moving object determining process, and sets a moving object flag and a front vehicle flag on the filter data (Step S17). The target detecting unit 73 derives an absolute speed and a traveling direction of the target of the vehicle indicated by the filter data on the basis of the relative speed of the filter data and the speed of the vehicle obtained from a vehicle speed sensor 21.

The target detecting unit 73 determines that the target is a moving object if the absolute speed of the filter data is a predetermined speed (for example, 1 km/h) or higher, and turns the moving object flag ON. The target detecting unit 73 determines that the target is a standstill object if the absolute speed of the filter data is lower than a predetermined speed (for example, 1 km/h), and turns the moving object flag of the target OFF.

The target detecting unit 73 turns the front vehicle flag ON if the traveling direction of the filter data is the same direction as the vehicle and the absolute speed of the filter data is a predetermined speed (for example, 18 km/h) or higher, and turns the front vehicle flag OFF if the filter data does not satisfy these conditions.

Subsequently, the target detecting unit 73 determines whether or not the target information of the filter data is an output object to the vehicle control apparatus 2. Specifically, the target detecting unit 73 determines whether the filter data is a vehicle body (main body) or an accessory portion of the side mirror or the like other than the vehicle body. In the case where the target detecting unit 73 determines the filter data to be a main data, the target information of the filter data is used as the output object to the vehicle control apparatus 2. In the case where the target detecting unit 73 determines the filter data to be the accessory portion, the target information of the filter data is not used as the output object to the vehicle control apparatus 2. Hereinafter, an output determination process will be described in detail with reference to FIG. 5 and FIG. 6.

4-1. Processing of Output Determination

Figure 5:
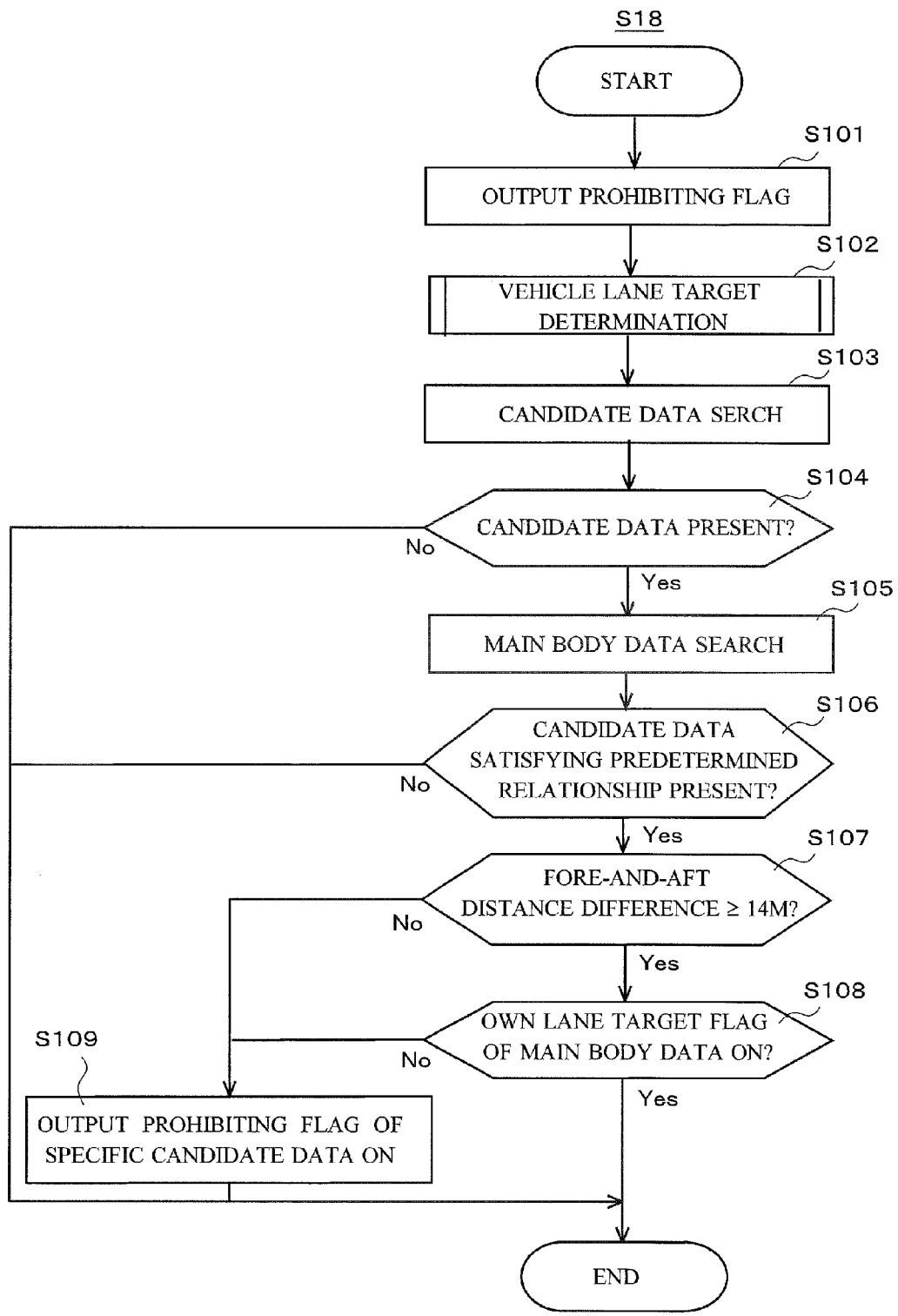
FIG. 5 is a flowchart for explaining a process of an output determination.

FIG. 5 is a flowchart for explaining an output determination process. First of all, the target detecting unit 73 sets an output prohibiting flag of the filter data to OFF (Step S101). The output prohibiting flag is an index indicating whether or not the target information of the filter data is the output object to the vehicle control apparatus 2. In the case where the output prohibiting flag of the filter data is OFF, the target information of the filter data is the output object to the vehicle control apparatus 2. In the case where the output prohibiting flag of the filter data is ON, the target information of the filter data is not an output object to the vehicle control apparatus 2. The target detecting unit 73 sets all of the output prohibiting flags of the filter data to OFF in Step S101 at first, and then determines whether to continue OFF or to switch to ON in accordance with the result of determination on the basis of a plurality of determination conditions which will be described below.

Subsequently, the target detecting unit 73 sets an own lane target flag of the filter data (Step S102). The target detecting unit 73 sets the own lane target flag to ON for the filter data present in the own lane having a minimum fore-and-aft distance and detected continuously in the target detection process by a plurality of times. In other words, the target detecting unit 73 sets the own lane target flag to ON for the filter data of the preceding vehicle as a follow-up object. The expression "within the own lane" here means "within a range of the lane where the vehicle travels". The range is, for example, a range of 1.8 m in the vehicle width direction to the left and the right from the position of the vehicle, assuming that the position of the vehicle traveling substantially at a center of the own lane to be a lateral distance of 0 m. Assuming that the left side of the vehicle is negative (minus) and the right side is positive (plus), the range corresponds to a range from −1.8 m to +1.8 m with respect to the position of the vehicle (±0 m).

Figure 6:
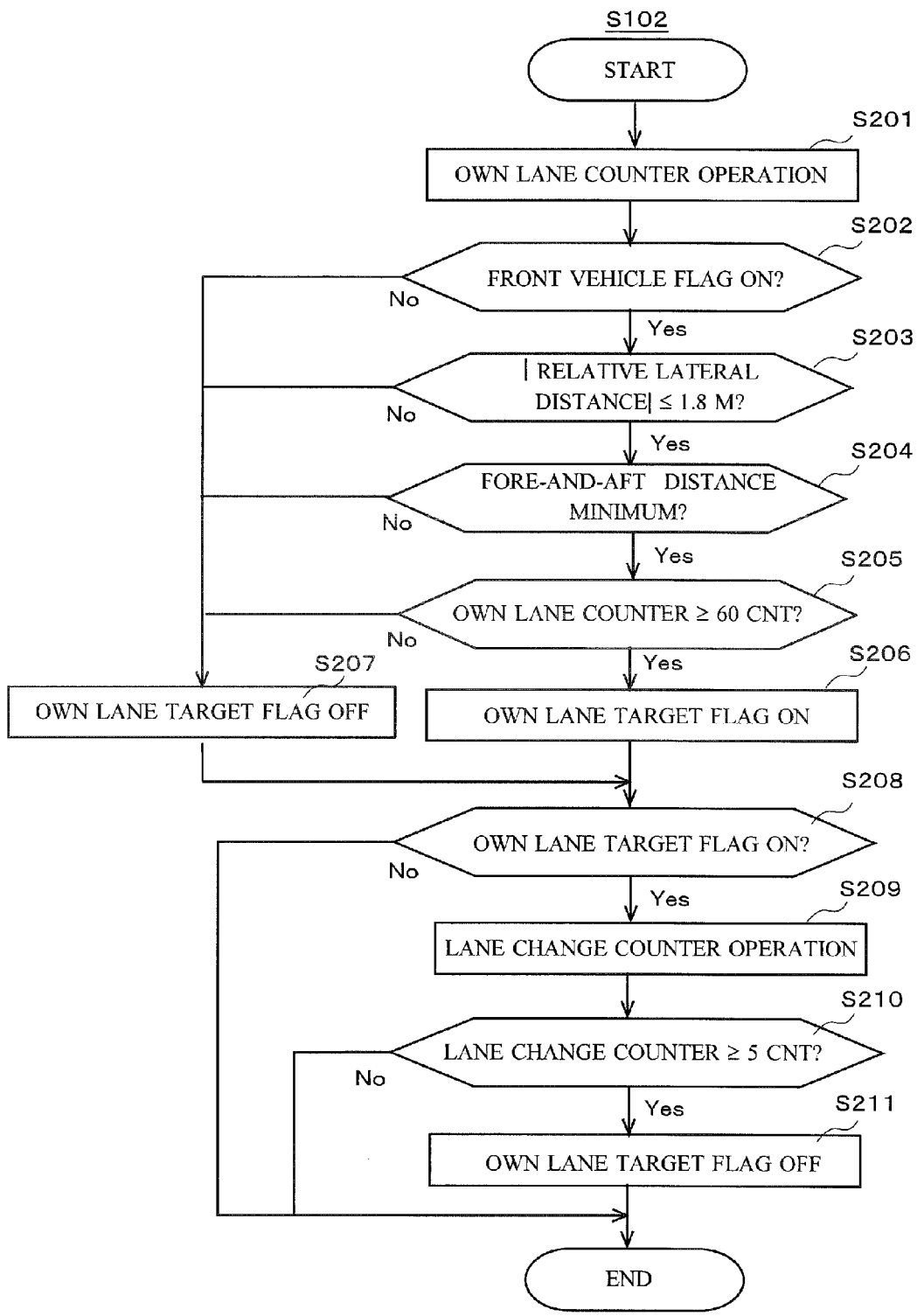
FIG. 6 is a flowchart for explaining an own lane target determination process.

Therefore, the filter data in which the own lane target flag is OFF includes the filter data not having the minimum fore-and-aft distance even being included in the own lane and the filter data present out of the own lane such as an adjacent lane. The own lane target flag is one of the setting conditions of the output prohibiting flag described later. Referring now to FIG. 6, the contents of an own lane target determination process will be described.

4-2. Own Lane Target Determination Process

FIG. 6 is a flowchart for explaining an own lane target determination process. The target detecting unit 73 operates an own lane counter of the filter data as the first process (Step S201). The own lane counter is a counter which increments a counted value when the filter data is detected within the own lane. When the filter data is detected in the own lane, the target detecting unit 73 increments, for example, one count of the counted value of the own lane counter of the corresponding filter data in one target detection process. Other operations relating to the own lane counter will be described later.

Subsequently, the target detecting unit 73 determines whether or not the front vehicle flag of the filter data is ON (Step S202). If the traveling direction of the target indicated by the filter data is the same direction as the vehicle, and the absolute speed of the filter data is higher than the predetermined speed in the process of the moving object determination (Step S17) illustrated in FIG. 4, the front vehicle flag of the filter data is ON. The target detecting unit 73 determines (Step S203) whether or not an absolute value of the relative lateral distance of the filter data is 1.8 m or shorter in the case where the front vehicle flag of the filter data is ON (Yes in Step S202).

In the case where the absolute value of the relative lateral distance of the filter data is 1.8 m or smaller (Yes in Step S203), that is, in the case where the filter data is present within the own lane, the target detecting unit 73 determines whether or not the fore-and-aft distance of the filter data is the minimum in the filter data present in the own lane (Step S204).

The lateral distance includes a relative lateral distance and an absolute lateral distance. The relative lateral distance is a lateral distance of the target with respect to a center axis in the case where the vehicle travels along a curve. The absolute lateral distance is a lateral distance of the target with respect to a center axis in the case where the vehicle travels straight ahead. The center axis is a virtual axis extending in the direction of output of the transmitting wave from the radar apparatus 1, and in the case where the vehicle turns along a curve, it assumes a curved shape on the basis of a radius of the curve. In the case where the vehicle travels straight ahead, the center axis is an axis which assumes a straight line shape along the direction of travel of the vehicle at a substantially center of the transmission range of the transmitting wave. The radius of the curve is calculated from steering angle information of the steering sensor 82. In the following description, when the term "lateral distance" is used, it is used as meaning the relative lateral distance. However, the relative lateral distance may be replaced by the absolute lateral distance.

In the case where the fore-and-aft distance of the filter data is the minimum (Yes in Step S204), the target detecting unit 73 determines whether or not the counted value of the own lane counter is a first counted value (for example, 60) or larger (Step S205). The case where the counted value is 60 or more means that the filter data is detected continuously by at least 60 times of the target detection process. Assuming that one process of the target detection process takes approximately 50 msec, it means that the target detecting unit 73 detects the filter data having the continuousness of approximately 3000 msec. or more.

In the case where the counted value of the own lane counter of filter data is 60 or larger (Yes in Step S205), the target detecting unit 73 sets the own lane target flag of the corresponding filter data to ON (Step S206).

In the case where the filter data having the minimum fore-and-aft distance in the own lane is detected continuously by the plurality of times of the target detection process, the target detecting unit 73 sets the own lane target flag of the corresponding filter data to ON.

In the case where filter data does not satisfy the conditions in the Steps S202 to 205, the target detecting unit 73 sets the own lane target flag of the corresponding filter data to OFF. Specifically, the own lane target flag of the filter data is set to OFF in the following cases. It is either one of the case where the front vehicle flag of the filter data is OFF (No in Step S202), in the case where the absolute value of the relative lateral distance of the filter data exceeds 1.8 m (No in Step S203), in the case where the fore-and-aft distance of the filter data is not the minimum in the own lane (No in Step S204), and in the case where the counted value of the own lane counter of the filter data is smaller than 60 (No in Step S205).

Subsequently, the target detecting unit 73 determines whether or not the own lane target flag of the filter data is ON after the process of Step S206 (Step S208). The target detecting unit 73 operates a lane change counter (Step S209) in the case where the own lane target flag of the filter data is ON (Yes in Step S208). The target detecting unit 73 terminates the process of the own lane target flag determination in the case where the own lane target flag of the filter data is OFF (No in Step S208). Therefore, the following process is a process to be performed only with respect to the filter data whereof the own lane target flag is ON.

The lane change counter described above is a counter configured to increment the counted value in the case where the target relating to the filter data is changing the lane. When the filter data is detected within the adjacent lane, the target detecting unit 73 increments, for example, one count of the counted value of the lane change counter of the corresponding filter data in one target detection process. Other operations of the lane change counter will be described later.

The expression "within the adjacent lane" here means "within part of a lane adjacent to the own lane". Specifically, it is a range of 3.3 m (±3.3 m) in a vehicle width direction to the left and the right from the position of the vehicle, assuming that the position of the vehicle traveling substantially at a center of the own lane to be a lateral distance of 0 m. Assuming that the left side of the vehicle is negative (minus) and the right side is positive (plus), the range corresponds to a range from −3.3 m to +3.3 m with respect to the position of the vehicle (±0 m).

The target detecting unit 73 performs a lane change counter operation in the process in Step S209, and then determines whether or not the counted value of the lane change counter of the filter data is 5 or larger (Step S210). In the case where the counted value of the lane change counted value of filter data is 5 or larger (Yes in Step S210), the target detecting unit 73 switches the own lane target flag of the corresponding filter data from ON to OFF (Step S211).

In the case where the counted value of the lane change counter of filter data is smaller than 5 in the process of Step S210 (No in Step S210), the target detecting unit 73 holds the own lane target flag of the filter data to ON and terminates the process of the own lane target flag determination.

In this manner, in the case where the filter data has changed the lane completely to the adjacent lane, the target detecting unit 73 switches the own lane target flag of the corresponding filter data. In other words, when filter data whereof an absolute value of the relative lateral distance becomes 3.3 m or larger is detected continuously by five times or more of the target detection process, the target detecting unit 73 switches the own lane target flag of the corresponding filter data from ON to OFF. This filter data is filter data belonging to the same object.

Accordingly, the radar apparatus 1 is capable of determining accurately whether or not the filter data is data of the target present at a position closest to the vehicle within the own lane. In other words, the radar apparatus 1 is capable of determining accurately whether or not the target information of the filter data is target information of the output object with respect to the vehicle control apparatus 2.

Subsequently, returning back to Step S103 in FIG. 5, the description of the output determination will be continued.

The target detecting unit 73 searches filter data which becomes a candidate of an accessory portion of the vehicle (hereinafter, referred to as a "candidate data") from a plurality of filter data on which the own lane target determination is performed (Step S103). The candidate data is, for example, filter data which satisfies two conditions, namely a condition that the front vehicle flag is ON and a condition that the fore-and-aft distance is 25 m or more. The target detecting unit 73 extracts all of the filter data which may possibly be the accessory portion of the body of the vehicle such as a side mirror or a loaded baggage by the candidate data search.

In the case where one or more candidate data is present (Yes in Step S104), the target detecting unit 73 performs a main body data search that searches filter data of the body (main body) of the vehicle that the candidate data belong to (hereinafter, referred to as "main body data") (Step S105). Specifically, the target detecting unit 73 employs certain candidate data as reference data, and extracts other candidate data having a predetermined dependency with respect to the reference data.

The predetermined dependency means a relationship in which other filter data becomes candidate data of the accessory portion belonging to the same vehicle as the reference data. The target detecting unit 73 extracts other filter data which are present, for example, at a position within a distance of +20 m from the position of the reference data in a fore-and-aft direction and at a position within a lateral distance of ±2.5 m from the position of the reference data, and which have a relative speed having 5 km/h or less difference in absolute value from the relative speed of the reference data as data having a predetermined dependency with respect to the reference data. Here, the relative speed of the reference data and the relative speeds of other filter data are the relative speed with respect to the speed of a host vehicle CA (hereinafter referred to simply as "vehicle CA").

If no candidate data is present in Step S104 (No in Step S104), the target detecting unit 73 terminates the output determination process.

In the case where other candidate data having the predetermined dependency with respect to the reference data (hereinafter, referred to as "specific candidate data") is extracted by the main body data search (Yes in Step S106), the target detecting unit 73 determines whether or not a fore-and-aft direction difference between the main body data as the reference data and the specific candidate data is a predetermined distance (for example, 14 m) or longer (Step S107).

If no specific candidate data which satisfies requirements of the predetermined dependency is present in Step S106 (No in Step S106), the target detecting unit 73 terminates the output determination process.

In the case where the fore-and-aft distance difference between the main body data and the specific candidate data is a predetermined distance or longer (Yes in Step S107), the target detecting unit 73 determines whether or not the own lane target flag of the main body data is ON (Step S108). In the case where the own lane target flag of the main body data is ON (Yes in Step S108), the target detecting unit 73 terminates the process of the output determination while holding the output prohibiting flag of the specific candidate data in an OFF state.

In contrast, in the case where the fore-and-aft distance difference between the main body data and the specific candidate data is smaller than the predetermined distance (No in Step S107), and a case where the own lane target flag of the main body data is OFF (No in Step S108), the target detecting unit 73 switches the output prohibiting flag of the specific candidate data from OFF to ON (Step S109) and terminates the output determination process. In such a case, the target detecting unit 73 determines that the specific candidate data is the accessory portion such as a side mirror belonging to the same vehicle as the main body data.

In this manner, in the process of the output determination, there is a case where the target detecting unit 73 holds OFF of the output prohibiting flag, which is set in the initial process (Step S101), and a case where the target detecting unit 73 switches the output prohibiting flag from OFF to ON. Hereinafter, the respective cases will be described with reference to specific examples illustrated in FIG. 7 and FIG. 8. First of all, the case where the output prohibiting flag is switched from OFF to ON will be described.

Figure 7:
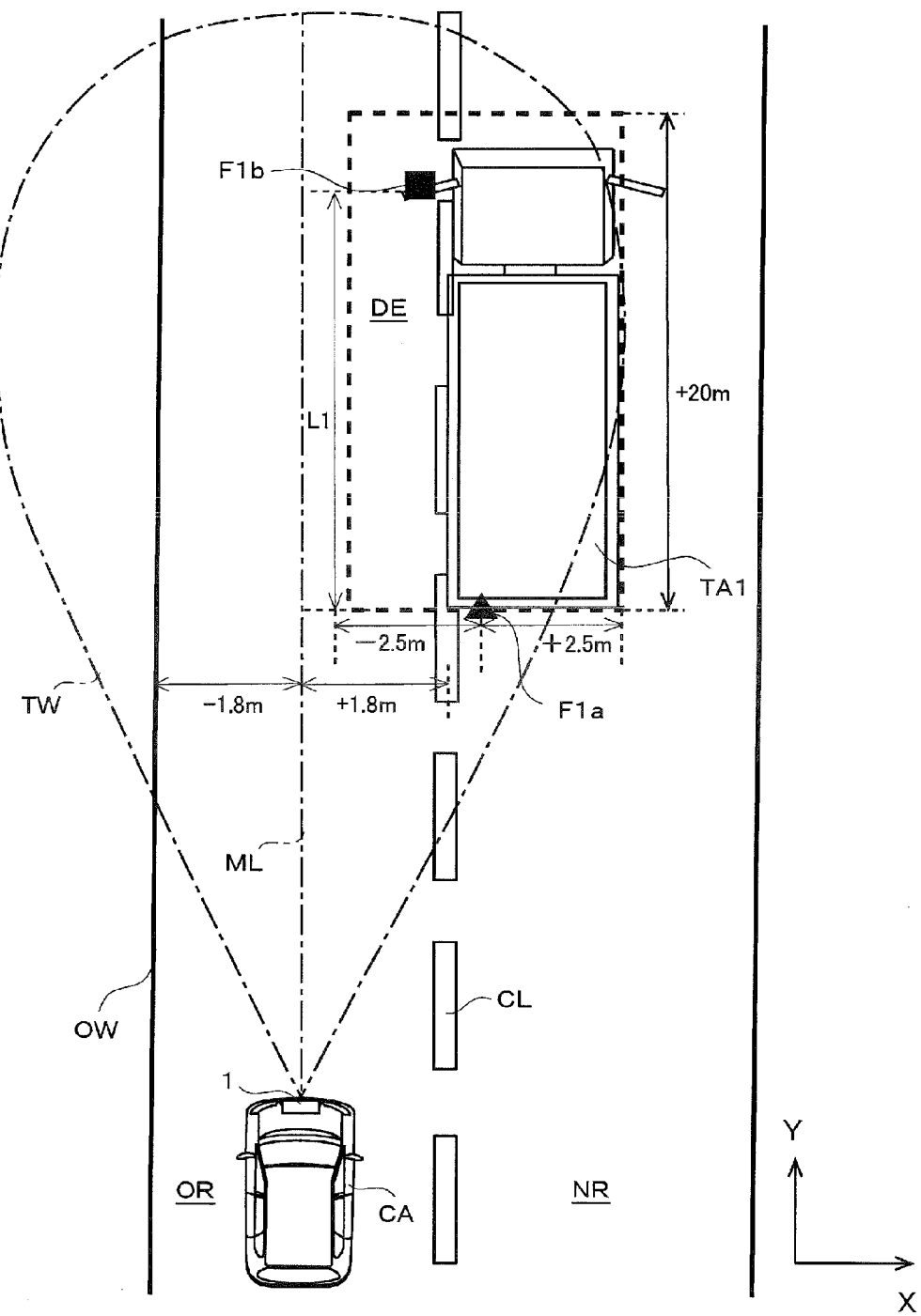

FIG. 7 is a drawing for explaining a specific example in which an output prohibiting flag is switched to ON. In the following drawings, directions will be described by using two dimensional XY coordinate axes. The XY coordinate axes are fixed relatively with respect to the vehicle CA. The vehicle width direction of the vehicle CA corresponds to an X-axis direction, and the traveling direction of the vehicle CA corresponds to a Y-axis direction. +X direction corresponds to the right direction of the vehicle CA, −X direction corresponds to the left direction of the vehicle CA, +Y direction corresponds to the traveling direction in front of the vehicle CA, and −Y direction corresponds to the traveling direction on the rear side of the vehicle CA.

The vehicle CA traveling in an own lane OR illustrated in FIG. 7 is provided with the radar apparatus 1, and a front vehicle TA1 traveling in an adjacent lane NR, which is a lane adjacent to the own lane OR is included in a transmission range of the transmitting wave TW of the radar apparatus 1. The front vehicle TA1 is, for example, a truck and is a vehicle larger than general vehicles in the entire length of the vehicle body, the vehicle width, and the accessory portion.

The target detecting unit 73 detects filter data F1a (▲) on the basis of a reflected wave from the vehicle body of the front vehicle TA1 and filter data F1b (■) on the basis of a reflected wave from a left side mirror. A reference value (±0 m) of the fore-and-aft distance and the lateral distance of the filter data will be as follows. The position of the radar apparatus 1 (the position of the vehicle CA) corresponds to the fore-and-aft distance±0 m, and the position of a center axis ML indicated by an alternate chain line corresponds to the lateral distance±0 m. When the vehicle CA travels straight ahead, the center axis ML extends in a direction of emission of the transmitting wave TW (+Y direction), and is a virtual axis located at a substantially center of the transmission range of the transmitting wave TW. The target information of the filter data F1a is, for example, the fore-and-aft distance+40 m, the lateral distance+2.0 m, and an absolute speed 60 km/h. The target information of the filter data F1b includes, for example, the fore-and-aft distance+53 m, the lateral distance+1.2 m, and an absolute speed 60 km/h.

The target detecting unit 73 now sets the output prohibiting flag of the filter data F1a and F1b to OFF in the process in Step S101 illustrated in FIG. 5 of the output determination.

The filter data F1a is a target present in an adjacent lane NR. In other words, the filter data F1a is not a target present in the own lane OR. The filter data F1b is a target present in the own lane OR, and is a target having a minimum fore-and-aft distance in the own lane OR. Therefore, the target detecting unit 73 sets the own lane target flag of the filter data F1a to OFF and sets the own lane target flag of the filter data F1b to ON in the own lane target determination in Step S102.

In FIG. 7, within the own lane OR is the front of the vehicle CA (+Y direction), and in a range of approximately ±1.8 m in the lateral distance from the center axis ML when the vehicle CA travels substantially the center of the own lane OR. Specifically, the range of the lateral distance+1.8 m is a range from the center axis ML to a boundary CL. The boundary CL is a line indicating a boundary between the own lane OR and the adjacent lane NR, and is a line extending in the Y-axis direction. The range of the lateral distance −1.8 m is a range from the center axis ML to a side wall OW of the own lane OR.

The filter data F1a and F1b will be described as data in which the traveling direction of the target indicated by the filter data is the same direction as the vehicle CA (+Y direction), and the absolute speed is a predetermined speed (for example, 18 km/h) or higher. The fore-and-aft distance of the filter data F1a and Fab is described as data of 25 m or longer. Therefore, the front vehicle flag of the filter data F1a and F1b is ON.

The target detecting unit 73 extracts the filter data F1a and F1b as the candidate data in the candidate data search in Step S103. In this manner, two candidate data are present, and the conditions of Step S104 is satisfied (which corresponds to Yes in Step S104).

Subsequently, the target detecting unit 73 searches other candidate data included in a determination range DE indicated by a broken line with the filter data F1a, which is the candidate data as the reference data in the main body data search in Step S105. The determination range DE is a range within the distance in the fore-and-aft direction +20 m (+Y direction) and the distance in the lateral direction±2.5 m (X-axis direction) from the position of the filter data F1a that is the reference data, as a reference (fore-and-aft distance±0 m and the lateral distance±0 m). The filter data F1b that is other candidate data is present in the determination range DE. The filter data F1b belongs to the front vehicle TA1, which is the same vehicle as the filter data F1a. Then, an absolute value of the difference between the relative speed of the filter data F1b and the relative speed of the filter data F1a is within 5 km/h (60−60=0 km/h).

The target detecting unit 73 extracts, as specific candidate data F1b, the filter data F1b that is other candidate data present within the determination range DE based on main body data F1a that is the filter data F1a serving as the reference data. Accordingly, the conditions of Step S106 is satisfied (which corresponds to Yes in Step S106).

Since the process of the main body data search is performed on all of the candidate data, the process of the main body data search is also performed on the filter data F1b. Here, since other candidate data is not present in the front (+Y direction) of the filter data F1b, the filter data F1b does not become the main body data.

The target detecting unit 73 determines whether or not the difference between a fore-and-aft distance (40 m) of the main body data F1a and a fore-and-aft distance (53 m) of the specific candidate data F1b is a predetermined distance (for example, 14 m) or longer in the calculation of the fore-and-aft distance difference in Step S107.

The reason why the fore-and-aft distance difference is used for determination is as follows. For example, in the case where two data of the main body data F1a and the specific candidate data F1b are data relating to separate vehicles such as the preceding vehicle and the pre-preceding vehicle, if the preceding vehicle changes the lane, the lane is changed while securing the distance from the pre-preceding vehicle (for example, 14 m or more). A fore-and-aft distance difference L1 between the main body data F1a and the specific candidate data F1b is 10 m (53−40=13 m). Therefore, since the conditions in Step S107 is not satisfied (which corresponds to No in Step S107), the target detecting unit 73 determines that the specific candidate data F1b is data of the accessory portion of the same vehicle as the main body data F1a.

In other words, in setting of the output prohibiting flag in Step S109, the target detecting unit 73 switches the output prohibiting flag of the specific candidate data F1b from OFF to ON. Accordingly, the radar apparatus 1 does not output the target information of the filter data F1b corresponding to the accessory portion to the vehicle control apparatus 2. Consequently, the vehicle control apparatus 2 does not set the target of the accessory portion of the adjacent vehicle, and can perform adequate vehicle control with respect to the vehicle CA in following up of the preceding vehicle.

There is a case where the fore-and-aft distance difference L1 reaches 14 m or more nevertheless the filter data F1a and F1b are data on the same vehicle. For example, in the case where the filter data F1a and F1b are data relating to a vehicle having a relatively long length as a whole such as a truck, the conditions of the Step S107 may be satisfied (which corresponds to Yes in Step S107) due to the fore-and-aft distance difference between the filter data. F1a and F1b. However, the main body data F1a is not detected within the own lane. Therefore, the own lane target flag of the main body data F1a is set to OFF, and the conditions of the Step S108 are not satisfied (which corresponds to No in Step S108). Consequently, the target detecting unit 73 switches the output prohibiting flag of the specific candidate data F1b from OFF to ON in the process of Step S109.

Here, the reason why determination on the basis of the fore-and-aft distance difference in Step S107 and determination on the basis of the own lane target flag of the main body data in Step S108 are performed in the process of the output determination is that there are, for example, filter data corresponding to the main body of the preceding vehicle (hereinafter, referred to as "preceding vehicle data") is detected at a position of the main body data F1a and filter data corresponding to the main body of the pre-preceding vehicle (hereinafter, referred to as "pre-preceding vehicle data") is detected at a position of the specific candidate data F1b.

Specifically, in the case where the preceding vehicle changes the lane and is detected in the adjacent lane having a lateral distance of approximately 3.3 m or longer in absolute value, preceding vehicle data is detected near the position of the main body data F1a. In the case where the pre-preceding vehicle travels in the own lane, the pre-preceding vehicle data is detected at a position near the specific candidate data F1b. In other words, the preceding vehicle data and the pre-preceding vehicle data have a predetermined dependency with respect to the main body data F1a and the specific candidate data F1b.

If the output prohibiting flag of the pre-preceding vehicle data present near the position of the specific candidate data F1b is switched to ON in such a case, the pre-preceding vehicle data whereof the fore-and-aft distance becomes minimum in the own lane is not output to the vehicle control apparatus 2 after the preceding vehicle has changed a lane completely to the adjacent lane. Consequently, in the control of the preceding vehicle follow-up of the vehicle CA, inadequate vehicle control such as an acceleration of the vehicle CA under an erroneous recognition that there is no vehicle to be followed up may be performed nevertheless there is a vehicle to be followed up present in front (+Y direction) of the traveling direction of the vehicle CA.

Figure 8:
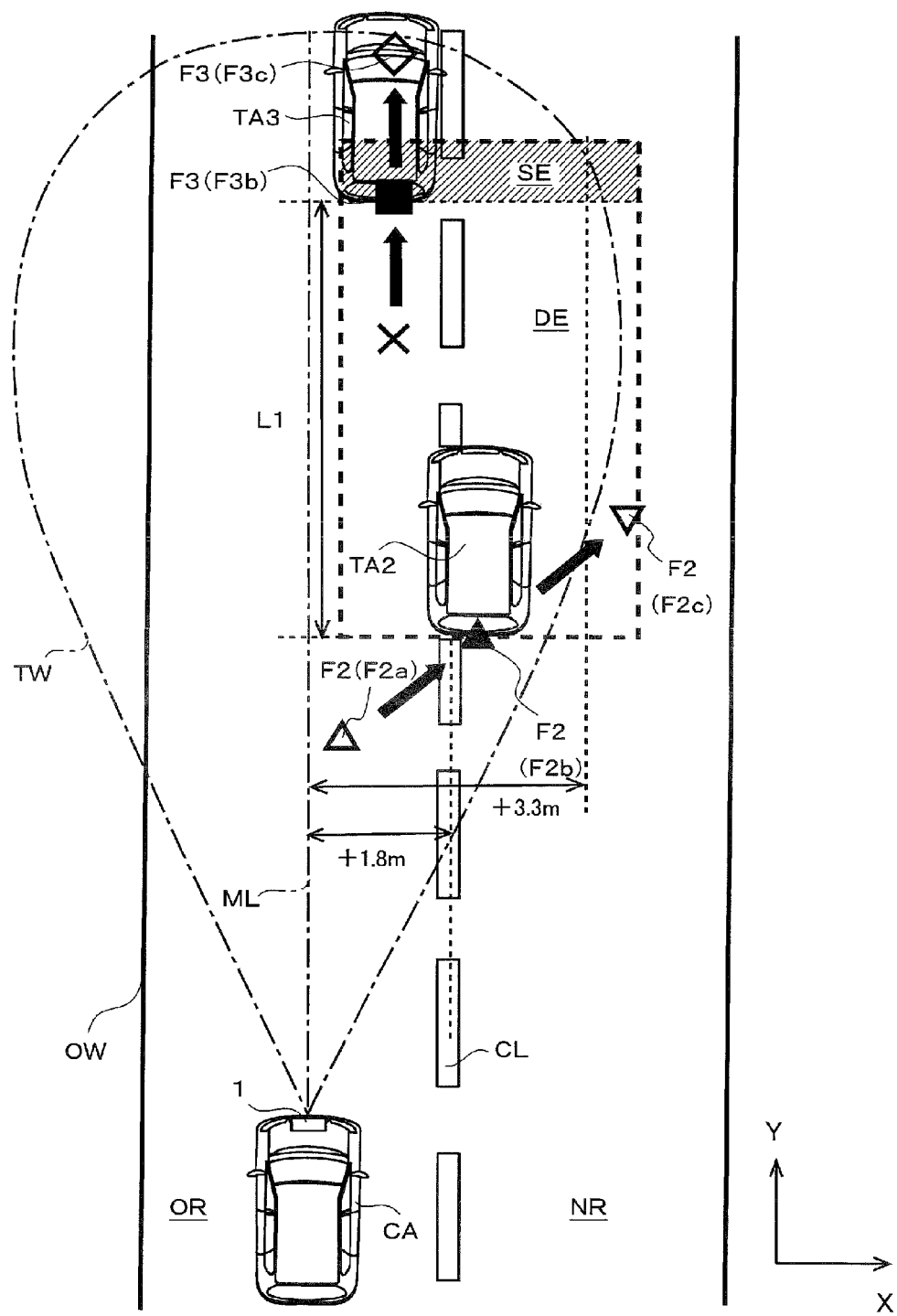
FIG. 8 is a drawing for explaining a specific example in which the output prohibiting flag is held to OFF.

Therefore, as illustrated in FIG. 8, in the case where preceding vehicle data F2 and pre-preceding vehicle data F3 are detected, if the conditions of the Step S107 and S108 described above are satisfied, the process of holding the output prohibiting flag of the pre-preceding vehicle data to be OFF is performed. A specific example will be given below with reference to FIG. 8.

FIG. 8 is a drawing for explaining a specific example in which the output prohibiting flag is held to OFF. The transmission range of the transmitting wave TW of the radar apparatus 1 includes a preceding vehicle TA2 moving from the own lane OR to the adjacent lane NR and a pre-preceding vehicle TA3 traveling in the own lane OR. The target detecting unit 73 detects filter data F2b (preceding vehicle data F2b) (▲) on the basis of a reflected wave from the vehicle body of the preceding vehicle TA2 and filter data F3b (pre-preceding vehicle data F3b) (■) on the basis of the reflected wave from the vehicle body of the pre-preceding vehicle TA3 in a process at a certain timing in the plurality of times of the target detection process (the process at time t2, described later).

In the target detection process before the process at the time t2 at which the preceding vehicle data F2b is detected (in the process of time t1 described later), filter data F2a (the preceding vehicle data F2a) (Δ) of the preceding vehicle TA2 is detected. In the process at the time t1, the filter data of the pre-preceding vehicle TA3 is not detected (x). At the time point of the process of the time t1, the pre-preceding vehicle TA3 is present at substantially right front of the preceding vehicle TA2. Therefore, the transmitting wave output from the radar apparatus 1 does not reach the pre-preceding vehicle TA3, and the radar apparatus 1 cannot receive the reflected wave from the pre-preceding vehicle TA3. Therefore, in the process at the time t1, the pre-preceding vehicle data F3 is not detected.

In the target detection process after the process at the time t2 (in the process of time t4 described later), filter data (pre-preceding vehicle data F2c) (∇) of the pre-preceding vehicle TA2 is detected and filter data (pre-preceding vehicle data F3c) (◊) of the pre-preceding vehicle TA3 is detected.

The preceding vehicle TA2 travels in the own lane OR during the plurality of times of the target detection process, changes the lane to the adjacent lane, and then changes the lane completely to the adjacent lane NR. The pre-preceding vehicle TA3 travels straight ahead in the own lane OR during the plurality of times of target detection process.

Figure 9:
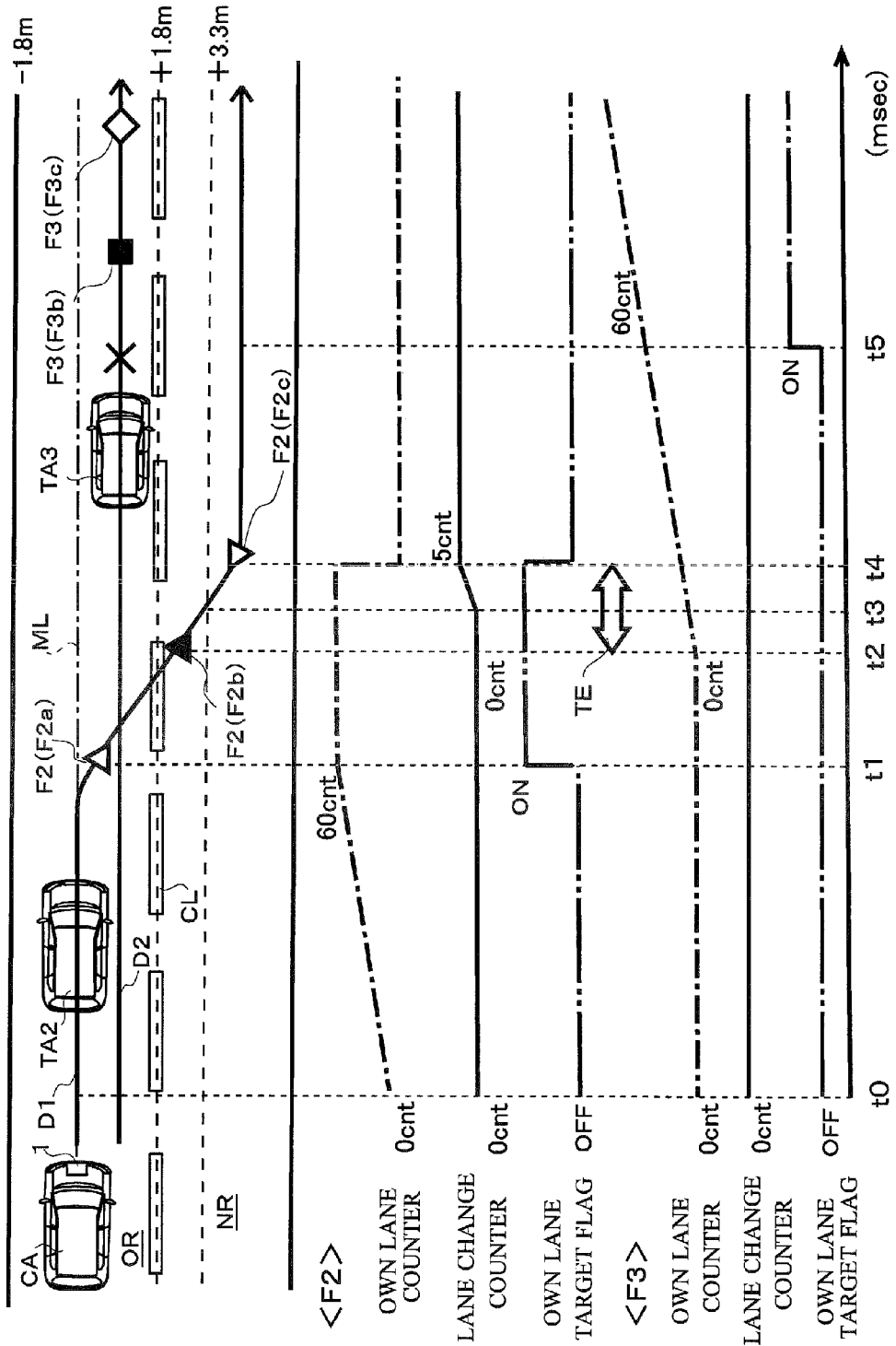
FIG. 9 is a drawing mainly illustrating a transition of counters and flags of preceding vehicle data, and pre-preceding vehicle data with time.

Referring to preceding vehicle data F2 in FIG. 8 and FIG. 9 which illustrates the detection of the pre-preceding vehicle data F3 in time series, a specific example of the case where the output prohibiting flag is held at OFF will be described in detail below. FIG. 9 is a drawing mainly illustrating a transition of counters and flags of preceding vehicle data F2 and pre-preceding vehicle data F3 with time.

In an upper part of FIG. 9, the position of movement of the preceding vehicle TA2 and the pre-preceding vehicle TA3 with time is illustrated. In other words, a movement locus D1 of the preceding vehicle TA2 and a movement locus D2 of the pre-preceding vehicle TA3 are illustrated. In a lower part of FIG. 9, a transition of the own lane counter, the lane change counter, and the own lane target flag with time is illustrated. These counters and the flag are illustrated for each of the preceding vehicle data F2 and the pre-preceding vehicle data F3.

The position of the pre-preceding vehicle data F3 illustrated on the movement locus D2 on the upper part of FIG. 9 corresponds to the position of time when the preceding vehicle data F2 illustrated on the movement locus D1 is detected. For example, the position of the pre-preceding vehicle data F3b is the position when the preceding vehicle data F2b is detected at the time t2, and the position of the pre-preceding vehicle data F3c is the position when the preceding vehicle data F2c is detected at the time t4.

The target detecting unit 73 operates the own lane counter, the lane change counter, and the own lane target flag on the basis of predetermined conditions. Therefore, before describing FIG. 9, description on operating conditions and operation contents of the respective counters will be described with reference to FIG. 10.

4-3. Operating Conditions and Operation Content

FIG. 10 is a drawing for explaining operating conditions and operation contents of the respective counters. Items in the left side of FIG. 10 are operation conditions of the counter that the target detecting unit 73 performs, and items on the right side are operation contents of the counter when the operation conditions are satisfied. Information on these operating conditions and the operation contents are memorized in the memory 63 in advance, and are referenced when the target detecting unit 73 performs the own lane counter operation (Step S201 in FIG. 6) and the lane change counter operation (Step S208 in FIG. 6).

The counter operating condition in FIG. 10 (hereinafter, referred to as "operating condition) (a) will be described. In the case where an absolute value of the relative lateral distance of the filter data is 1.8 m or shorter, the target detecting unit 73 increments the counted value of the own lane counter of the filter data by one. Such an increment of the counter value of the own lane counter indicates that filter data of a preceding vehicle is detected by the traveling of the preceding vehicle in the own lane OR at timing of a certain target detection process.

An operating condition (b) will be described below. In the case where an absolute value of the relative lateral distance of the filter data is 3.3 m or longer, the target detecting unit 73 increments the counted value of the lane change counter of the filter data by one. Such an increment of the counted value of the lane change counter indicates that filter data of a preceding vehicle is detected within the adjacent lane NR by the lane change of the preceding vehicle.

An operating condition (c) will be described below. In the case where an counted value of the lane change counter of filter data is 5 or higher, the target detecting unit 73 sets the counted value of the own lane counter of the filter data to zero. In this manner, setting the counted value of the own lane counter to zero indicates that the lane change of the preceding vehicle is completed and the filter data thereof is detected in the adjacent lane NR.

An operating condition (d) will be described below. In the case where an absolute value of the relative lateral distance of the filter data is shorter than 3.3 m, the target detecting unit 73 sets the counted value of the lane change counter of the filter data to zero. In this manner, setting the counted value of the lane change counter indicates that the preceding vehicle is present not in the adjacent lane NR, but in the own lane OR, or the lane change from the own lane OR to the adjacent lane NR is being performed. In other words, this condition is satisfied in the case where the filter data of the preceding vehicle is detected either in the own lane OR (|relative lateral distance|≤1.8 m), or between the own lane OR and the adjacent lane NR (1.8 m<|relative lateral distance|<3.3 m).

An operating condition (e) will be described below. The target detecting unit 73 sets the counted values of both of the own lane counter and the lane change counter of the filter data to zero in the case where the filter data of the preceding vehicle is not detected in a state of having temporal continuousness and hence is not detected, or is detected anew. In this manner, setting the counted values of the counters to zero means that the preceding vehicle is present neither in the own lane OR nor in the adjacent lane NR, or the preceding vehicle is not present at a position between the own lane OR and the adjacent lane NR. It also indicates that filter data of a preceding vehicle is detected anew in the case where the preceding vehicle is present at any position.

An operating condition (f) will be described below. In the case where the filter data does not satisfy any of the operating conditions (a) to (e), the target detecting unit 73 holds both of the own lane counter and the lane change counter of the filter data at the current counter values. Holding of the counter values as described above indicates that the extrapolating process is performed on the filter data of the preceding vehicle, for example.

4-4. Transition of Counter and Flag

The target detecting unit 73 operates the own lane counter, the lane change counter, and the own lane target flag illustrated in FIG. 9 on the basis of the above-described operating conditions (a) to (f). A lateral axis of FIG. 9 represents time (msec), and the target detecting unit 73 performs a plurality of times of the target detection process, for example, at a cycle of ½0 second during the times t0 to t6.

At time t0, the target detecting unit 73 detects the preceding vehicle data F2 of the preceding vehicle TA2 present in the own lane. Since the preceding vehicle data F2 satisfies the operating condition (a), the counted value of the own lane counter of the preceding vehicle data F2 is incremented by one. Since the preceding vehicle data F2 satisfies the operating condition (d), the lane change counter is set to zero. Since the counted value of the own lane counter of the preceding vehicle data F2 at the time t0 is smaller than 60, the target detecting unit 73 sets the own lane target flag of this data to OFF.

Specifically, in the process of the output determination in FIG. 5 at the time t0, the output prohibiting flag of the preceding vehicle data F2 becomes OFF (Step S101), and the counted value of the own lane counter is incremented by one by the own lane target determination (Step S102). Then, the preceding vehicle data F2 becomes the candidate data (Steps S104 and S105). However, since other candidate data having the preceding vehicle data F2 as the main body data is not detected (No in Step S106), the target detecting unit 73 holds the output prohibiting flag of the preceding vehicle data F2 to OFF and terminates the process of the output determination.

At the time t0, the target detecting unit 73 does not detect the pre-preceding vehicle data F3. It is because the pre-preceding vehicle TA3 is present at a position substantially right front of the preceding vehicle TA2, and the transmitting wave from the radar apparatus 1 does not reach the pre-preceding vehicle TA3. Consequently, the target detecting unit 73 sets the counted values of the own lane counter and the lane change counter of the pre-preceding vehicle data F3 to zero, and sets the own lane target flag to OFF.

Subsequently, at the time t1, the target detecting unit 73 continues from the time t0 to detect the preceding vehicle data F2a (F2) relating to the preceding vehicle TA2. Since the preceding vehicle data F2a satisfies the operating condition (a), the own lane counter of the preceding vehicle data F2a is incremented by one. Since the preceding vehicle data F2a satisfies the operating condition (d), the lane change counter is set to zero. The own lane counter of the preceding vehicle data F2a continuously increases from the time t0, and an integrated value becomes 60 by the increment at the time t1. Accordingly, the own lane target flag of the preceding vehicle data F2a is set to ON.

Specifically, in the process of the output determination at the time t1, the output prohibiting flag of the preceding vehicle data F2a becomes OFF (Step S101), and the own lane target flag of the preceding vehicle data F2a becomes ON by the own lane target determination (Step S102). Then, the preceding vehicle data F2a becomes the candidate data (Steps S104 and S105). However, since other candidate data having the preceding vehicle data F2a as the main body data is not detected (No in Step S106), the target detecting unit 73 holds the output prohibiting flag of the preceding vehicle data F2a to OFF and terminates the process of the output determination.

In the process at the time t1, the target detecting unit 73 does not continuously detect the pre-preceding vehicle data F3 relating to the pre-preceding vehicle TA3 from the time t0. Therefore, the target detecting unit 73 sets the counted values of the own lane counter and the lane change counter of the pre-preceding vehicle data F3 to zero, and sets the own lane target flag to OFF.

Subsequently, at the time t2, the target detecting unit 73 continues from the time t1 to detect the preceding vehicle data F2b (F2) relating to the preceding vehicle TA2. The preceding vehicle data F2b does not satisfy the operating condition (a), but satisfies the operating condition (d). Therefore, the target detecting unit 73 does not increment the counted values of the own lane counter of the preceding vehicle data F2b, and sets the counted value of the lane change counter to zero. The own lane counter holds the integrated value up to the time t2. In other words, ON of the own lane target flag of the preceding vehicle data F2a is held.

In the process at the time t2, the target detecting unit 73 detects the pre-preceding vehicle data F3b (F3) present in the own lane OR. At the moment of the time t2, the preceding vehicle TA2 changes the lane from the own lane OR to the adjacent lane NR, and takes a position in the vicinity of the boundary CL. Therefore, the transmitting wave from the radar apparatus 1 reaches the pre-preceding vehicle TA3, and the radar apparatus 1 receives the reflected wave from the pre-preceding vehicle TA3. Consequently, the target detecting unit 73 detects the pre-preceding vehicle data F3b. Since the pre-preceding vehicle data F3b satisfies the operating condition (a), the own lane counter of the pre-preceding vehicle data F3b is incremented by one. Since the pre-preceding vehicle data F3b satisfies the operating condition (d), the lane change counter is set to zero. Since the counted value of the own lane counter of the pre-preceding vehicle data F3b at the time t2 is smaller than 60, the own lane target flag of this data becomes OFF.

A determination process at the time t2 will be described in detail with reference again to FIG. 8. Here, description will be given with the target information of the preceding vehicle data F2b and the pre-preceding vehicle data F3b having the following values. The target information of the preceding vehicle data F2b includes, for example, the fore-and-aft distance+40 m, the lateral distance+2.0 m, and an absolute speed 63 km/h. The target information of the pre-preceding vehicle data F3b includes, for example, the fore-and-aft distance+54 m, the lateral distance+1.2 m, and an absolute speed 60 km/h.

The target detecting unit 73 sets the output prohibiting flag of the preceding vehicle data F2b and the pre-preceding vehicle data F3b to OFF in the process in Step S101 of the output determination.

The preceding vehicle data F2b here is not a target detected in the own lane OR in the process at the time t2. However, the preceding vehicle data F2b is filter data detected in the own lane OR in the process before the time t2 and having the own lane target flag turned ON. The preceding vehicle data F2b is currently changing the lane from the own lane OR to the adjacent lane NR, and is not filter data detected in the adjacent lane NR (relative lateral distance|≥3.3 m). Therefore, the preceding vehicle data F2b does not satisfy the operating condition (c) which sets the own lane counter to zero (which corresponds to Step S209 illustrated in FIG. 6). Accordingly, the target detecting unit 73 holds the own lane target flag of the preceding vehicle data F2b to ON in the own lane target determination in Step S102.

Since an integrated value of the counted value of the own lane counter in the pre-preceding vehicle data F3b is smaller than 60 (which corresponds to No in Step S205), the own lane target flag is set to OFF.

The front vehicle flags of the preceding vehicle data F2b and the pre-preceding vehicle data F3b are ON. Therefore, the target detecting unit 73 extracts the preceding vehicle data F2b and the pre-preceding vehicle data F3b as the candidate data in the candidate data search in Step S103. In this manner, since two candidate data are present, the conditions of Step S104 are satisfied (which corresponds to Yes in Step S104).

Subsequently, the target detecting unit 73 searches other candidate data included in a determination range DE of an area indicated by a broken line with the preceding vehicle data F2b, which is the candidate data as the reference data in the main body data search in Step S105. The pre-preceding vehicle data F3b as other candidate data is detected in the determination range DE. Since an absolute value of a difference between the relative speed of the preceding vehicle data F2b and the relative speed of the pre-preceding vehicle data F3b is within 5 km/h (63−60=3 km/h), the target detecting unit 73 extracts the preceding vehicle data F2b, which is reference data as main body data F2b and the pre-preceding vehicle data. F3b as specific candidate data F3b. Accordingly, the conditions of Step S106 are satisfied (which corresponds to Yes in Step S106).

Since the process of the main body data search is performed on all of the candidate data, the process of the main body data search is performed on the pre-preceding vehicle data F3b. Here, since other candidate data is not present in the front (+Y direction) of the pre-preceding vehicle data F3b, the pre-preceding vehicle data F3b does not become the main body data.

The target detecting unit 73 determines whether or not the difference between a fore-and-aft distance (40 m) of the main body data F2b and a fore-and-aft distance (54 m) of the specific candidate data F3b is a predetermined distance (14 m) or longer in the calculation of the fore-and-aft distance difference in Step S107. Since a fore-and-aft distance difference L1 between the main body data F2b and the specific candidate data F3b is 14 m (54−40=14 m), the conditions of the Step S107 are satisfied (which corresponds to Yes in Step S107). In other words, the targets of the preceding vehicle and the pre-preceding vehicle are detected and it is determined that the preceding vehicle keeps the distance from the pre-preceding vehicle in order to start to change the lane. Accordingly, the radar apparatus 1 is capable of determining whether or not the preceding vehicle is changing the lane from the own lane accurately, and is capable of reliably determining whether or not the target of the pre-preceding vehicle is set to an output object.

The distance in the for-and-aft direction of the determination range DE illustrated in FIG. 8 is one of parameters for determining whether or not the pre-preceding vehicle data F3b has a predetermined dependency with reference to the preceding vehicle data F2b. In the case where the pre-preceding vehicle data F3b is detected between the distance (for example, 20 m) of the determination range DE in the fore-and-aft direction, and a distance (for example, 14 m) in the fore-and-aft direction which corresponds to the fore-and-aft distance difference L1, the preceding vehicle data F2b and the pre-preceding vehicle data F3b have a predetermined positional relationship.

An area in which data having the predetermined positional relationship is detected within the determination range DE as described above is an extracted area SE illustrated in FIG. 8. The extracted area SE is determined by a first position whereof the length in the fore-and-aft direction (Y-axis direction) is derived from the fore-and-aft distance difference (14 m) and a second position corresponding to the distance in the fore-and-aft direction (20 m) with reference to the position of the preceding vehicle data F2b as the reference data. Specifically, a portion between the first position apart from the position of the reference data by +14 m, and the second position apart therefrom by +20 m corresponds to the length of the fore-and-aft direction of the extracted area SE. The lengths in the lateral direction (X-axis direction) are the same as that of the determination range DE. The radar apparatus 1 performs the output determination on the basis of the extracted area SE including the position in the vicinity of a position farthest from the reference data in the determination range DE. Accordingly, the radar apparatus 1 is capable of determining whether or not the pre-preceding vehicle data is the output object with respect to the vehicle control apparatus 2 accurately.

The target detecting unit 73 determines whether or not the own lane target flag of the main body data F2b is ON in the own lane target flag determination process in Step S108. Since the own lane target flag of the main body data F2b is set to ON, the conditions of the Step S108 are satisfied (which corresponds to Yes in Step S108).

Consequently, the target detecting unit 73 holds OFF of the output prohibiting flag of the specific candidate data F3b and terminates the process of the output determination. Accordingly, the radar apparatus 1 is capable of determining whether or not the target is the output object to the control apparatus accurately, and hence is capable of outputting the target of the output object reliably to the vehicle control apparatus 2. Specifically, after the preceding vehicle TA2 present in the own lane has changed the lane into the adjacent lane completely, the target information of the pre-preceding vehicle TA3 which becomes a preceding vehicle anew can be output to the vehicle control apparatus 2 reliably. The vehicle control apparatus 2 acquires the target information of the pre-preceding vehicle TA3 from the radar apparatus 1, so as to be capable of performing adequate vehicle control with respect to the vehicle CA with the pre-preceding vehicle TA3 as the follow-up object. The target detecting unit 73 holds OFF of the output prohibiting flag of the main body data F2b.

Referring back to FIG. 9, at the time t3, the target detecting unit 73 continues from the time t2 to detect the preceding vehicle data F2 relating to the preceding vehicle TA2. Since the preceding vehicle data F2 satisfies the operating condition (b), the target detecting unit 73 increments the counted value of the lane change counter of the preceding vehicle data F2 by one. The counted value of the counter of the own lane of the preceding vehicle data F2 is held at an integrated value of 60 or higher, and ON of the own lane target flag is held.

Since the pre-preceding vehicle data F3 present in the own lane satisfies the operating condition (a), the target detecting unit 73 increments the counted value of the own lane counter by one at the time t3. Since the pre-preceding vehicle data F3 satisfies the operating condition (d), the target detecting unit 73 sets the lane change counter to zero. In addition, since the counted value of the own lane counter of the pre-preceding vehicle data F3 is smaller than 60, the own lane target flag of this data is set to OFF.

Specifically, in the process of the output determination at the time t3, the target detecting unit 73 holds the output prohibiting flag of the pre-preceding vehicle data F3 to be OFF by detecting the pre-preceding vehicle data F3, which is other candidate data in the extracted area SE, and terminates the process of the output determination. The target detecting unit 73 holds OFF of also the output prohibiting flag of the main body data F2.

Subsequently, at the time t4, the target detecting unit 73 continues from the time t3 to detect the preceding vehicle data F2c (F2) relating to the preceding vehicle TA2. Since the preceding vehicle data F2c satisfies the operating condition (b), the target detecting unit 73 increments the counted value of the lane change counter of the preceding vehicle data F2c by one. The lane change counter of the preceding vehicle data F2c continuously increases from the time t2, and an integrated value becomes five by the increment at the time t4. Accordingly, the target detecting unit 73 switches the own lane target flag of the preceding vehicle data F2c from ON to OFF. The target detecting unit 73 sets the counted value of the own lane counter held to be 60 or higher integrated value to zero since the preceding vehicle data F2c satisfies the operating condition (c).

Since the pre-preceding vehicle data F3c detected in the own lane satisfies the operating condition (a), the target detecting unit 73 increments the counted value of the own lane counter by one at the time t4. Since the pre-preceding vehicle data F3 satisfies the operating condition (d), the target detecting unit 73 sets the lane change counter to zero. In addition, since the counted value of the own lane counter of the pre-preceding vehicle data F3c is smaller than 60, the target detecting unit 73 sets the own lane target flag of this data to OFF.

Specifically, in the process of the output determination at the time t4, the target detecting unit 73 holds the output prohibiting flag of the pre-preceding vehicle data F3c to be OFF by detecting the pre-preceding vehicle data F3c, which is other candidate data in the extracted area SE, and terminates the process of the output determination. The target detecting unit 73 holds OFF of the output prohibiting flag of the main body data F2c.

In a period in which the own lane target flag of the preceding vehicle data F2 is ON, and in which the pre-preceding vehicle data F3 is detected is determined as a determination segment TE. The target detecting unit 73 holds OFF of the output prohibiting flag of the pre-preceding vehicle data F3 in the case where the pre-preceding vehicle data F3 is detected in the extracted area SE during the determination segment TE. Accordingly, the radar apparatus 1 is capable of determining whether or not the target is the output object accurately to the vehicle control apparatus 2, and hence is capable of outputting the target of the output object reliably to the vehicle control apparatus 2. The vehicle control apparatus 2 is capable of performing adequate vehicle control with respect to the vehicle with the target acquired from the radar apparatus 1 as the follow-up object.

At the time t5, the target detecting unit 73 does not detect the preceding vehicle data F2 in the own lane from the time t4 onward. Therefore, the counted value of the own lane counter of the preceding vehicle data F2 is continuously zero from the time t4, and the target detecting unit 73 holds the own lane target flag of the preceding vehicle data F2 to OFF. The counted value of the lane change counter of the preceding vehicle data F2 is 5 or larger.

The target detecting unit 73 continues from the time t4 to detect the pre-preceding vehicle data F3 relating to the pre-preceding vehicle TA3. Since the pre-preceding vehicle data F3 satisfies the operating condition (a), the target detecting unit 73 increments the own lane counter of the pre-preceding vehicle data F3 by one. Since the pre-preceding vehicle data F3 satisfies the operating condition (d), the target detecting unit 73 sets the lane change counter to zero. The own lane counter of the pre-preceding vehicle data F3 continuously increments from the time t4. Therefore, the counted value of the own lane counter is incremented to 60 at the time t5. Accordingly, the target detecting unit 73 sets the own lane target flag of the pre-preceding vehicle data F3 to ON.

Specifically, in the process of the output determination at the time t5, the output prohibiting flag of the pre-preceding vehicle data F3 becomes OFF (Step S101), and the own lane target flag of the pre-preceding vehicle data F3 becomes ON by the own lane target determination (Step S102). Then, the pre-preceding vehicle data F3 becomes the candidate data (Steps S104 and S105). However, since other candidate data having the pre-preceding vehicle data F3 as the main body data is not detected (which corresponds to No in Step S106), the target detecting unit 73 holds the output prohibiting flag of the pre-preceding vehicle data F3 to OFF and terminates the process of the output determination. The target detecting unit 73 holds OFF of the output prohibiting flag of the main body data F2.

Returning back to the description in FIG. 4, the target detecting unit 73 performs the output determination process (Step S18), and then deletes the filter data F1b whereof the output prohibiting flag is turned to ON by the output determination from the memory 63 (Step S19). In this manner, the process of deleting the filter data is referred to as an unnecessary object removing process. Accordingly, the target information of the filter data F1b corresponding to the target of the side mirror of the front vehicle TA1 such as a truck is not output to the vehicle control apparatus 2. The pre-preceding vehicle data F3 whereof the output prohibiting flag is OFF is not deleted and is continuously recorded in the memory 63.

Subsequently, the target detecting unit 73 performs a coupling process (grouping process), and couples the filter data belonging to the same object among all the filter data into one (Step S20). For example, in the case where the transmitting wave TW is reflected from one vehicle, the transmitting wave TW normally reflects at a plurality of reflecting points of the vehicle. Therefore, the reflected wave RW reaches the radar apparatus 1 respectively from the plurality of the reflective points of the same vehicle, and hence the filter data relating to each of the plurality of reflecting points is derived.

The target indicated by the plurality of filter data as described above is the same vehicle, so that the target detecting unit 73 couples these filter data into one. The target detecting unit 73 couples the plurality of filter data which have, for example, the substantially same relative speed and similar in fore-and-aft distance and the lateral distance into one. The target information of the filter data after the coupling employs an average value of the target information of the plurality of filter data, which have been objects of coupling, for example.

Therefore, if the average values of the fore-and-aft distances and the lateral distances of the filter data F1$a$ and F1$b$ of the front vehicle TA1 illustrated in FIG. 7 described above are employed as the target information of the filter data of the front vehicle TA1, there is a case where the front vehicle TA1 traveling in the adjacent lane NR is determined to be present in the own lane. OR. However, the target detecting unit 73 sets the output prohibiting flag of the specific candidate data F1$b$ ON, and deletes the specific candidate data Fb1 from the memory 63 by the unnecessary object removing process described above, so that the specific candidate data F1$b$ does not become an object to be coupled, and the front vehicle TA1 is not determined as being present in the own lane OR.

Subsequently, a target output unit 74 outputs the target information of the filter data whereof the output prohibiting flag is OFF (the fore-and-aft distance, the relative speed, and the lateral distance) to the vehicle control apparatus 2 (Step S21). The target output unit 74 selects a predetermined plurality of number (for example, eight) of filter data if there are a large number of filter data, and outputs target detection information of only the selected filter data. The target output unit 74 selects filter data indicating a target traveling in the same traveling lane as the vehicle and indicating the target near the vehicle on the priority basis while considering the fore-and-aft distance and the lateral distance of the filter data.

5. Summary

As described thus far, in this embodiment, if the filter data is detected in a state in which the fore-and-aft distance is the minimum in the own lane (|relative lateral distance|≤1.8 m), the target detecting unit 73 increments the counted value of the own lane counter of this file data. The target detecting unit 73 then sets the own lane target flag of the filter data (for example, the preceding vehicle data F2) whereof the counted value of the own lane counter becomes a predetermined value (for example, 60) or higher out of the file data detected continuously in the plurality of times of the target detection process to ON.

Subsequently, the target detecting unit 73 holds ON of the own lane target flag of the preceding vehicle data F2 while the preceding vehicle TA2 corresponding to the preceding vehicle data F2 whereof the own lane target flag is set to ON is changing the lane from the own lane OR to the adjacent lane NR, and holds the counted value (60 or higher) of the own lane counter.

As a result of the lane change of the preceding vehicle TA2, the target detecting unit 73 detects the pre-preceding vehicle data F3 relating to the pre-preceding vehicle TA3. In the case where the pre-preceding vehicle data F3 is detected in the own lane OR, the target detecting unit 73 increments the counted value of the own lane counter of the pre-preceding vehicle data F3.

In this manner, in the case where the preceding vehicle data F2 whereof the own lane target flag is ON is detected while the lane change from the own lane OR to the adjacent lane NR is performed, the target detecting unit 73 holds the output prohibiting flag of the pre-preceding vehicle data F3 having a predetermined positional relationship with the preceding vehicle data F2 to OFF. Specifically, in the case where the pre-preceding vehicle data F3 is present in the determination range DE having a benchmark at the position of the preceding vehicle data F2, and the pre-preceding vehicle data F3 satisfies the predetermined positional relationship with respect to the preceding vehicle data F2, that is, in the case where the pre-preceding vehicle data F3 is detected in the extracted area SE, the target detecting unit 73 holds OFF of the output prohibiting flag of the pre-preceding vehicle data F3.

Subsequently, the target detecting unit 73 increments the counted value of the lane change counter of the preceding vehicle data F2 when the preceding vehicle data F2 is detected within the adjacent lane NR (|relative lateral distance|≥3.3 m). The target detecting unit 73 holds OFF of the output prohibiting flag of the pre-preceding vehicle data F3 when the counted value of the lane change counter is smaller than the predetermined value (5, for example) and the pre-preceding vehicle data F3 is detected in the extracted area SE.

In the case where the counted value of the lane change counter of the preceding vehicle data F2 detected continuously in the plurality of times of the target detection process becomes a predetermined value (5, for example) or higher, the target detecting unit 73 determines that the lane change of the preceding vehicle TA2 to the adjacent lane NR is completed and switches the own lane target flag of the preceding vehicle data F2 from ON to OFF.

If the counted value of the own lane counter of the pre-preceding vehicle data F3 becomes the predetermined value or higher, the target detecting unit 73 switches the own lane target flag of the pre-preceding vehicle data F3 from OFF to ON.

Accordingly, the radar apparatus 1 is prevented from determining the pre-preceding vehicle data F3 of the vehicle body (main body) of the pre-preceding vehicle TA3 as data of the accessory portion erroneously and deleting from the memory 63, and is capable of outputting the pre-preceding vehicle data F3 reliably to the vehicle control apparatus 2. Consequently, after the preceding vehicle TA2 has changed the lane completely, the vehicle control apparatus 2 is allowed to perform adequate vehicle control with respect to the vehicle CA with the pre-preceding vehicle TA3 as the follow-up object of the preceding vehicle.

Second Embodiment

Subsequently, a second embodiment will be described. A radar apparatus 1 of the second embodiment includes a vehicle determination process anew added in the output determination process described in the first embodiment. This vehicle determination process is a process in which candidate data which is not included in a determination range DE out of candidate data detected in an own lane OR is determined as data of a main body of a vehicle, not of an accessory portion.

The configuration and the process of the radar apparatus 1 of the second embodiment is substantially the same as that of the first embodiment. However, the contents of the process in the output determination is partly different as descried above. The different points will be mainly described with reference to FIG. 11 to FIG. 14.

6-1. Processing of Output Determination

Figure 11:
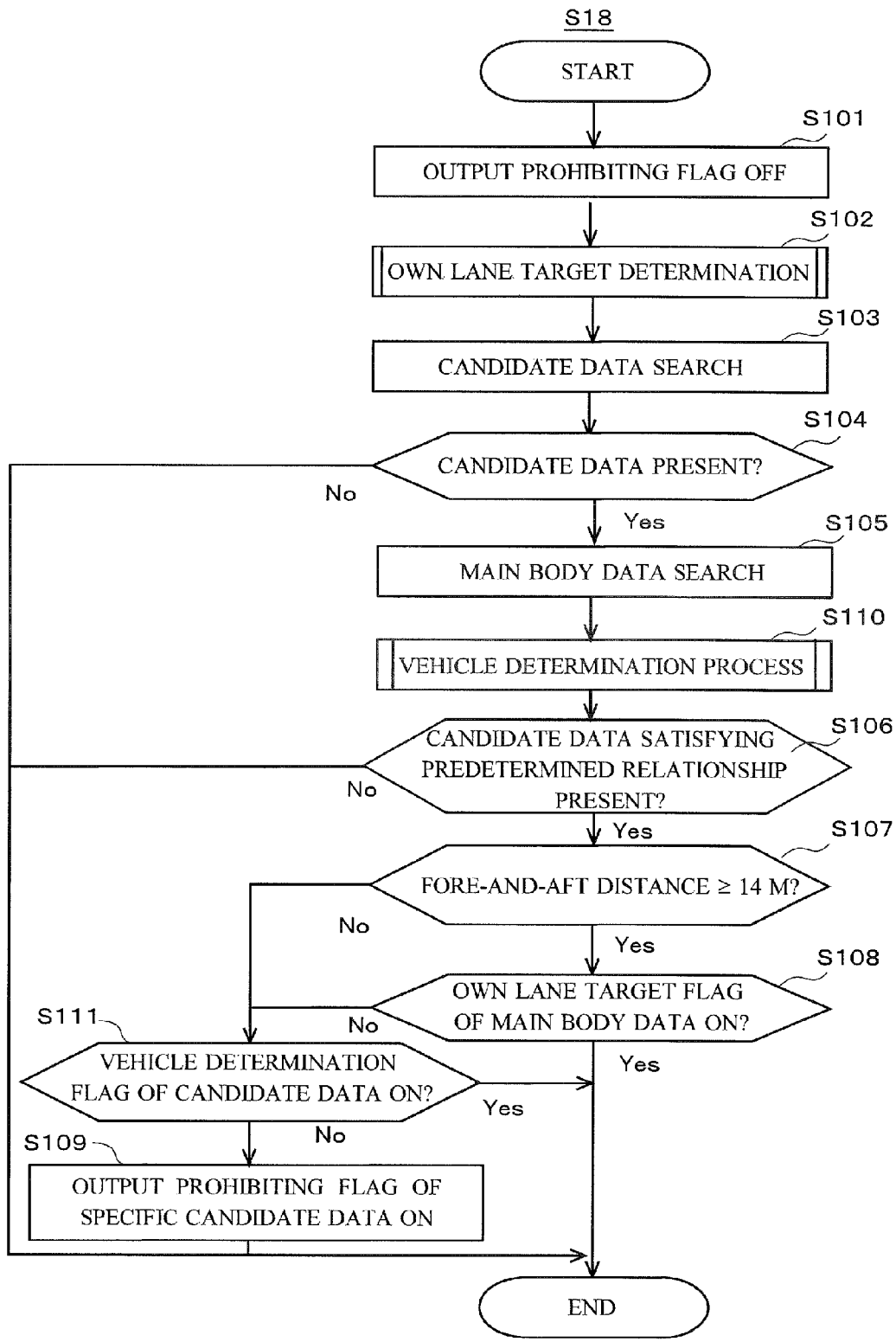
FIG. 11 is a flowchart for explaining a process of an output determination of a second embodiment.

FIG. 11 is a flowchart for explaining a process of an output determination of the second embodiment. FIG. 11 illustrates a process of the output determination described in FIG. 5 of the first embodiment including a process relating to a vehicle determination added thereto. A target detecting unit 73 performs a main data search described in the first embodiment (Step S105), and performs a process of the vehicle determination described below (Step S110).

Figure 12:
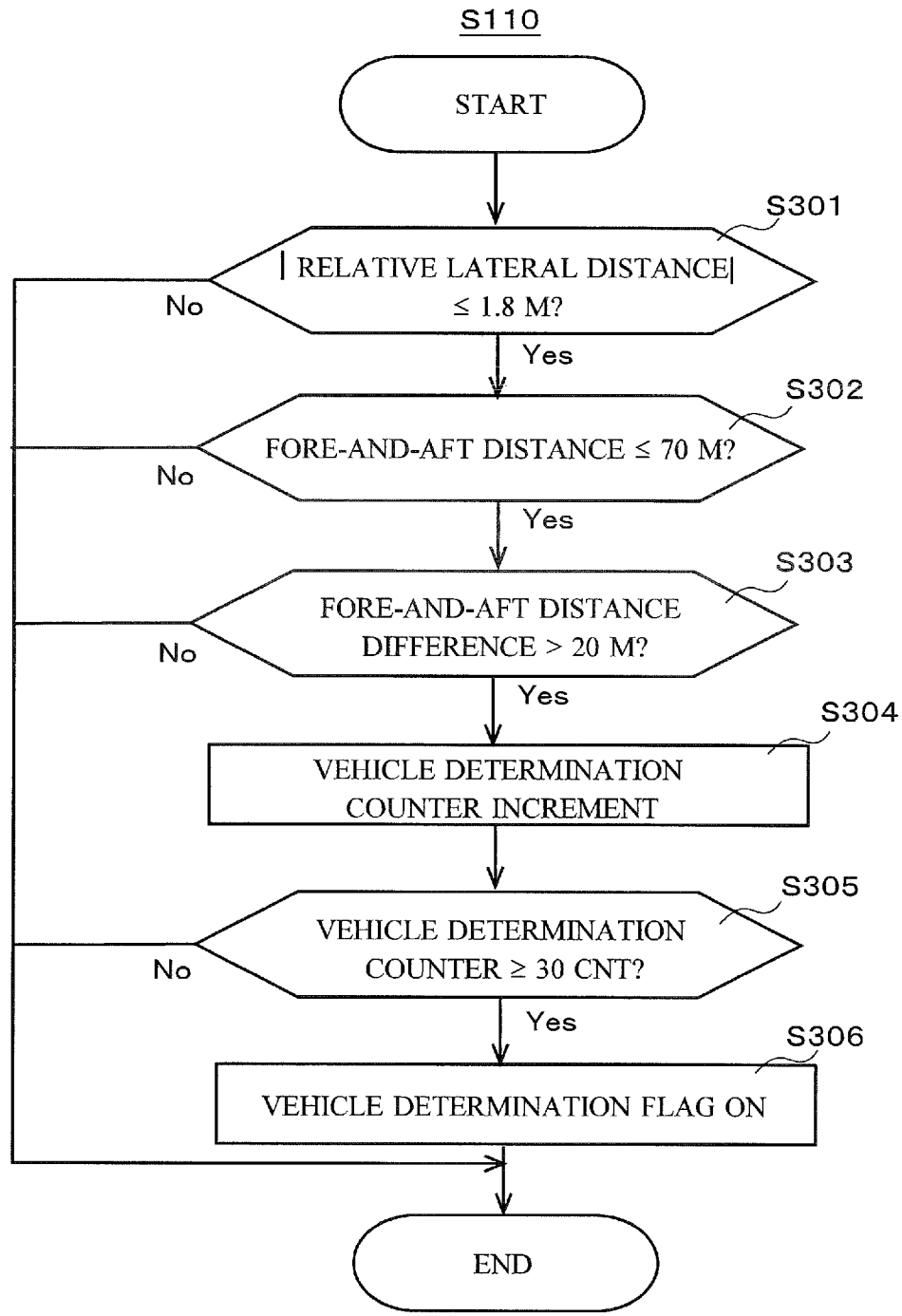
FIG. 12 is a flowchart of a process of vehicle determination.

Referring now to FIG. 12, the process of the vehicle determination will be described in detail. FIG. 12 is a flowchart of the process of the vehicle determination. The target detecting unit 73 performs the process of the vehicle determination for all of candidate data. The target detecting unit 73 determines whether or not an absolute value of a relative lateral distance of the candidate data is 1.8 m or smaller (Step S301). In the case where the absolute value of the relative lateral distance of the candidate data is 1.8 m or smaller (Yes in Step S301), the target detecting unit 73 determines whether or not a fore-and-aft distance of this candidate data is 70 m or smaller (Step S302). The case where the absolute value of the relative lateral distance of the candidate data is 1.8 m or smaller means, in other words, a case where the candidate data is present in the own lane OR.

In the case where the fore-and-aft distance of the candidate data is 70 m or smaller (Yes in Step S302), the target detecting unit 73 determines whether or not the fore-and-aft distance between the candidate data and the main body data exceeds 20 m (Step S303). In the case where the fore-and-aft distance between the candidate data and the main body data exceeds 20 m (Yes in Step S303), the target detecting unit 73 increments the counted value of a vehicle determination counter by one (Step S304). The case where the fore-and-aft distance between the candidate data and the main body data exceeds 20 m means, in other words, a case where the candidate data is detected out of the range of the determination range DE on the basis of reference data.

Subsequently, the target detecting unit 73 determines whether or not the candidate data is detected 30 times or more of the target detection process continuously (Step S305). In the case where the candidate data is detected in 30 times or more of the target detection process continuously (Yes in Step S305), the target detecting unit 73 sets a vehicle determination flag of the candidate data to ON (Step S306). By the vehicle determination flag turning ON, the candidate data is determined to be the data of the main body of the vehicle. The target detecting unit 73 holds OFF of an output prohibiting flag of the candidate data whereof the vehicle determination flag is set to ON. A filter data whereof the vehicle determination flag is turned ON is held continuously to be ON in the following processes.

In the case where the fore-and-aft distance difference is smaller than 14 m (No in Step S107) in the process of Step S107 of FIG. 11 or in the case where the own lane target flag of the main body data is OFF in the process of Step S108, the target detecting unit 73 determines whether or not the vehicle determination flag of the candidate data is ON (Step S111). In the case where the vehicle determination flag of the candidate data is ON (Yes in Step S111), the target detecting unit 73 holds OFF of the output prohibiting flag, and terminates the process of the output determination. The case where the vehicle determination flag of the candidate data is ON means, in other words, a case where the candidate data is filter data corresponding to the vehicle body of the vehicle. Accordingly, the radar apparatus 1 is prevented from deleting the candidate data determined to be the output object in the past erroneously from a memory 63 and determining the corresponding candidate data as a non-output object, and is capable of outputting reliably to a vehicle control apparatus 2.

In the case where the vehicle determination flag of the candidate data is OFF (No in Step S111), the target detecting unit 73 switches the output prohibiting flag of the candidate data from OFF to ON.

6-2. Transition of Counter and Flag

Figure 13:
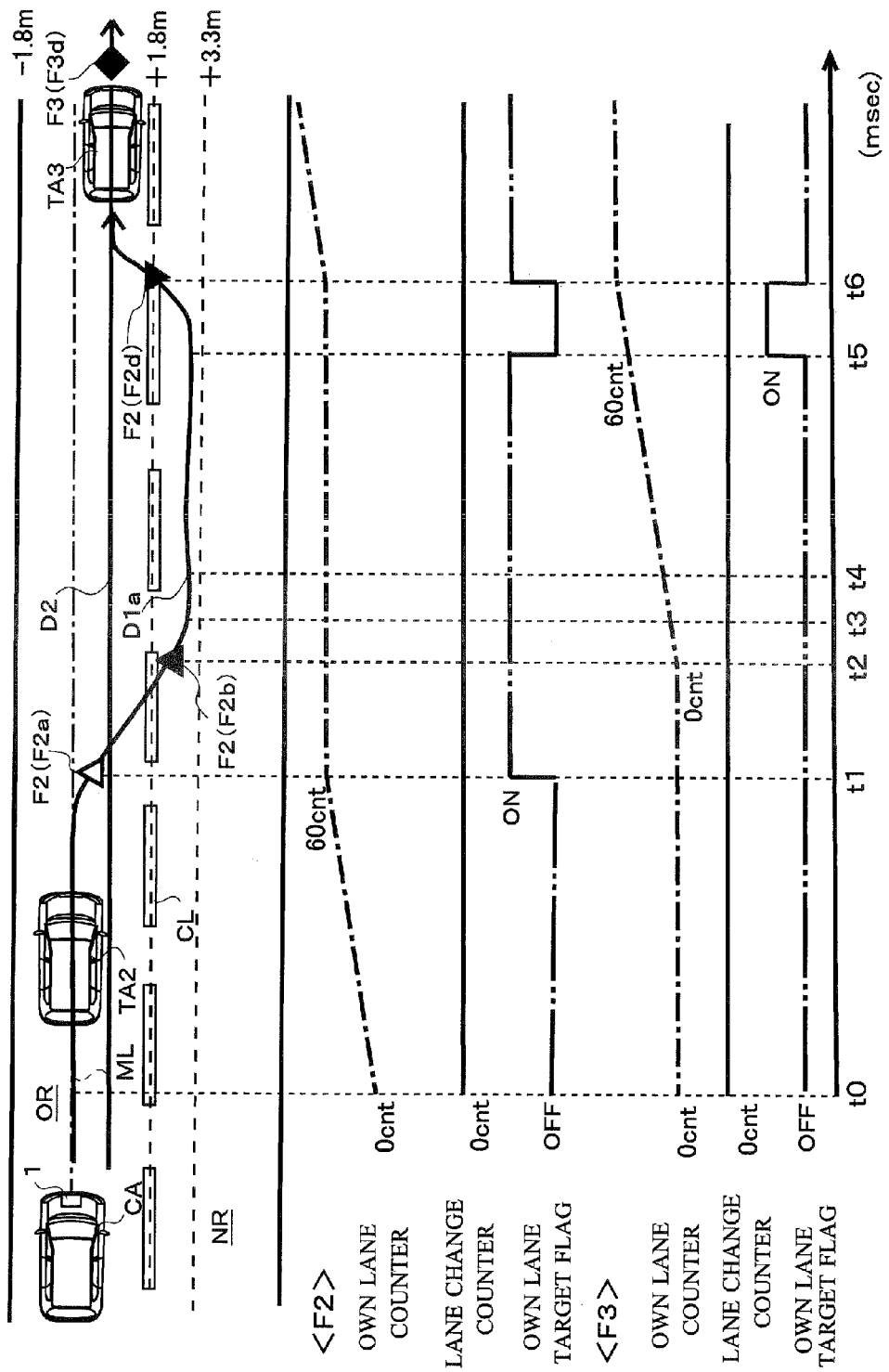
FIG. 13 is a drawing mainly illustrating a transition of counters and flags of preceding vehicle data and pre-preceding vehicle data with time according to the second embodiment.

Subsequently, a specific example in which the vehicle determination flag becomes ON by the vehicle determination process will be described with reference to FIG. 13. FIG. 13 is a drawing mainly illustrating a transition of counters of a preceding vehicle data F2 and a pre-preceding vehicle data F3, and a flag with time of the second embodiment. In FIG. 13, the process in the times t0 to t2 is the same as that of the first embodiment, and the positions of a preceding vehicle TA2 indicated by a movement locus D1a from the time t3 onward with time are different from the positions of the preceding vehicle TA2 indicated by the movement locus D1 with time in the first embodiment. Accordingly, the contents of the processes in the respective process timings are also different. The process from the time t3 onward will be described below.

At the times of day t3 and t4, the target detecting unit 73 detects the preceding vehicle data F2 between the own lane OR and an adjacent lane NR (1.8 m<|relative lateral distance|<3.3 m). Since the preceding vehicle data F2 satisfies an operating condition (d), the lane change counter is set to zero. The counted value of the counter of the own lane counter of the preceding vehicle data F2 is held at an integrated value of 60 or higher, and ON of the own lane target flag is held.

Since the pre-preceding vehicle data F3 present in the own lane satisfies an operating condition (a), the counter value of the own lane counter increments by one, and since the pre-preceding vehicle data F3 satisfies the operating condition (d), the lane change counter is set to zero. Since the counted value of the own lane counter of the pre-preceding vehicle data F3 at the times of day t3 and t4 is smaller than 60, the own lane target flag of this data becomes OFF.

At the time t5, the preceding vehicle TA2 is positioned in the vicinity of a boundary CL, so that the target detecting unit 73 detects the preceding vehicle data F2 between the own lane OR and the adjacent lane NR (1.8 m<|relative lateral distance|<3.3 m). Since the preceding vehicle data F2 satisfies the operating condition (d), the lane change counter is set to zero.

The target detecting unit 73 continues from the time t4 to detect the pre-preceding vehicle data F3 relating to the pre-preceding vehicle TA3. Since the pre-preceding vehicle data F3 satisfies the operating condition (a), the counter value of the own lane counter of the pre-preceding vehicle data F3 increments by one, and since the pre-preceding vehicle data F3 satisfies the operating condition (d), the lane change counter is set to zero. The own lane counter of the pre-preceding vehicle data F3 continuously increases from the time t2, and an integrated value becomes 60 by the increment at the time t5. Accordingly, the target detecting unit 73 switches the own lane target flag of the pre-preceding vehicle data F3 from OFF to ON. The filter data whereof the own lane target flag is ON is only one of all of the filter data in the own lane. Therefore, the target detecting unit 73 switches the own lane target flag of the preceding vehicle data F2 from ON to OFF.

The preceding vehicle data F2 whereof the own lane target flag is switched from ON to OFF at the time t5 satisfies the operating condition (d), and hence the lane change counter is set to zero, and the counted value of the own lane counter is held at 60 or higher.

Here, a process of switching the own lane target flag of the pre-preceding vehicle data F3 from OFF to ON and the own lane target flag of the preceding vehicle data F2 from ON to OFF in the target detection process at the time t5 will be described with reference to FIG. 14.

Figure 14:
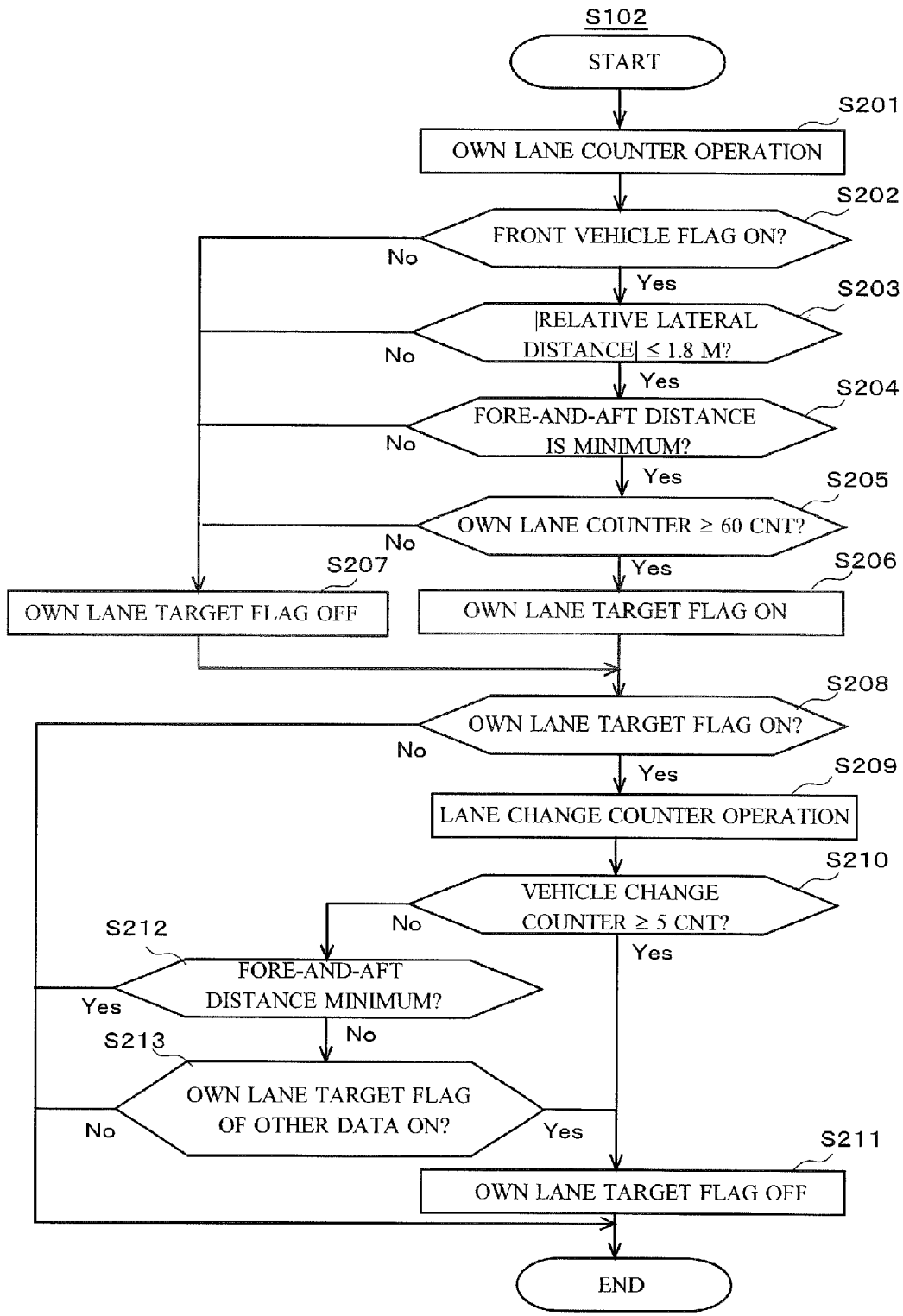
FIG. 14 is a flowchart for explaining a process of an own lane target determination of the second embodiment.

FIG. 14 is a flowchart for explaining a process of an own lane target determination of the second embodiment. The process flow chart is a process including the process in Step S212 and the process in Step S213 added to the process flowchart in FIG. 6, which has been described in conjunction with the first embodiment.

In the process of Step S206 illustrated in FIG. 14 in the target detection process at the time t5, the target detecting unit 73 switches the own lane target flag of the pre-preceding vehicle data F3 which satisfies the conditions of Steps S202 to S205 from OFF to ON. At the time point of this switching, the own lane target flag of the preceding vehicle data F2 is held to be ON.

The target detecting unit 73 performs the lane change counter operation (Step S209) with respect to both of the preceding vehicle data F2 and the pre-preceding vehicle data F3 whereof the own lane target flag is ON in the process of Step S208. Since the counted values of the lane change counter of the both data are smaller than 5 (No in Step S210) as a result of operation of the lane change counter, the target detecting unit 73 performs the process of Step S212.

The target detecting unit 73 determines whether or not the fore-and-aft distance is the minimum for both data (Step S212). At the time point of the process at the time t5, since the fore-and-aft distance of the pre-preceding vehicle data F3 becomes minimum (Yes in Step S212), the target detecting unit 73 holds ON of the own lane target flag of the pre-preceding vehicle data F3.

In contrast, since the fore-and-aft distance of the preceding vehicle data F2 is not the minimum at the time point of the process at the time t5 (No in Step S212), the target detecting unit 73 determines whether or not the own lane target flag of data other than the preceding vehicle data F2 is ON (Step S213). In this case, since the own lane target flag of the pre-preceding vehicle data. F3 becomes ON as described above, the target detecting unit 73 determines that the own lane flag of other data is ON (Yes in Step S213), and the own lane target flag of the preceding vehicle data F2 is switched from ON to OFF to terminate the own lane target determination process.

In this manner, in the case where the own lane target flags with respect to the preceding vehicle data F2 and the pre-preceding vehicle data F3 are switched at the timing of the same target detection process, the own lane target flags of the both data are turned ON temporarily in the own lane target determination process. After having subjected to the determination of the Steps S212 and S213, one of the both data of the own lane target flag is held to be ON, and the own lane target flag of the other data is switched from ON to OFF.

Subsequently, at the time t6 illustrated in FIG. 13, the preceding vehicle TA2 is moved into the own lane, so that the target detecting unit 73 detects the preceding vehicle data F2 in the own lane OR. Since the preceding vehicle data F2 (F2d) (▼) satisfies the operating conditions (a) and (d), the counted value of the own lane counter is incremented by one. Since the counted value of the own lane counter of preceding vehicle data F2d is 60 or larger, the target detecting unit 73 switches the own lane target flag from OFF to ON. In other words, by the own lane target determination described in conjunction with FIG. 14 described above, the target detecting unit 73 switches the own lane target flag of the preceding vehicle data F2d from OFF to ON. Accordingly, the target detecting unit 73 switches the own lane target flag of the pre-preceding vehicle data F3 (F3d) (♦) from ON to OFF.

Here, in the case where the target detecting unit 73 performs the process of the output determination which determines the preceding vehicle data F2 to be the main body data and the pre-preceding vehicle data F3 to be the candidate data (Step S18), the pre-preceding vehicle data F3 is detected in the own lane from the time t2 (Step S301), and conditions of other vehicle determination (Steps S302 to 305) are satisfied, whereby the vehicle determination flag is set to ON (Step S306). In this manner, when the vehicle determination flag of specific candidate data F3 is ON, even though the specific candidate data F3 and the main body data F2 have a predetermined dependency, the target detecting unit 73 holds OFF of the output prohibiting flag of the specific candidate data F3. Accordingly, in the case where the candidate data is filter data of the main body of the vehicle, the radar apparatus 1 can output the filter data reliably to the vehicle control apparatus 2 without deleting from the memory 63.

Modifications

Although the embodiments of this disclosure have been described thus far, this disclosure is not limited to the embodiments described above, and various modifications may be made. Such modifications will be described below. All of the modes including the above-described embodiment and modes described below may be combined as needed.

The embodiments described above have been described that the target detecting unit 73 performs the process of the output determination for the filter data detected from the processes in the past and having a predetermined number of times (for example, three times) or more of continuousness. In contrast, the target detecting unit 73 may perform the output determination process on data other than the filter data on pair data detected in the process of this time, for example.

In the embodiments described above, a distance in a fore-and-aft direction (+20 m), a distance in a lateral direction (±2.5 m), a relative speed (5 km/h), and a fore-and-aft distance difference (14 m) between the main data and specific candidate data, which become parameters of predetermined dependency have been described with specific numerical values as examples. These values are examples only, and other values are also applicable. For example, the fore-and-aft distance difference between the main body data and the specific candidate data may be a value smaller than 14 m (for example, 5 m). Consequently, an extracted area SE illustrated in FIG. 8 needs to be set to an arbitrary area in advance.

The embodiments given above describe that the target detecting unit 73 deletes the filter data whereof the output prohibiting flag is ON from the memory 63 in the unnecessary object removing process (Step S19). In contrast, when the target output unit 74 performs the process of the target information output (Step S21), the target detecting unit 73 may delete the filter data whereof the output prohibiting flag is ON from the memory 63. When the target detecting unit 73 performs the coupling process (Step S20), the filter data whereof the output prohibiting flag is ON is not become an object to be coupled. In this manner, deletion of the filter data whereof the output prohibiting flag is ON from the memory 63 may be performed at a timing other than the unnecessary object removing process.

In the description of the embodiments given above, the number of the transmitting antennas 40 of the radar apparatus 1 is one, and the number of the receiving antennas 51 is four. The numbers of the transmitting antennas 40 and the receiving antennas 51 of the radar apparatus 1 are examples only, and other numbers are applicable as long as the target information of a plurality of targets can be detected.

In the embodiments described above, ESPRIT has been exemplified as an angle estimating system of the radar apparatus 1. In addition, however, other angle estimating systems such as DBF (Digital Beam Forming), PRISM (Propagator method based on an Improved Spatial-smoothing Matrix), and MUSIC (Multiple Signal Classification) may be used.

In the description of embodiments given above, the radar apparatus 1 is provided in the front portion (for example, in a front bumper) of the vehicle. In contrast, the radar apparatus 1 may be provided on at least one of a rear portion (for example, a rear bumper), a left side portion (for example, a left door mirror), and a right side portion (for example, a right door mirror) as long as it is a position where the transmitting wave can be output to the outside of the vehicle.

In the embodiments described above, output from the transmitting antenna may be of any method as long as the target information such as an electric wave, an ultrasonic wave, light, and laser can be detected.

In the embodiments described above, the radar apparatus 1 may be used in those other than the vehicle. For example, the radar apparatus 1 may be used in aircrafts and ships.

In the description of the embodiments given above, various functions are implemented as software by the arithmetic processing of the CPU in accordance with the program. However, part of the functions may be implemented by an electric hardware circuit. In contrast, part of the functions which have been described as being implemented by the hardware circuit may be implemented by software.

While the invention has been shown and described in detail, the foregoing description is in all aspects illustrative and not restrictive. It is therefore understood that numerous other modifications and variations can be devised without departing from the scope of the invention.

What is claimed is:

1. A radar apparatus configured to set a first target to be a non-output object with respect to a control apparatus of a host vehicle in a case where the first target (1) has a fore-and-aft distance from the host vehicle that is larger than a fore-and-aft distance of a second target from the host vehicle and (2) has been determined to be an accessory portion which belongs to a same vehicle as the second target, the radar apparatus comprising a signal processor configured to:
   determine whether or not the second target is present in an own lane of the host vehicle;
   determine whether or not the second target is changing a lane; and
   set the first target, which previously had been determined to be the accessory portion which belongs to the same vehicle as the second target, to be an output object with respect to the control apparatus of the host vehicle and part of a different vehicle than the vehicle associated with the second target in a case where the second target is changing the lane from the own lane,
   wherein in a case where the first target (i) is determined to be present within a determination range in which the presence or absence of the accessory portion is determined and (ii) is in a vicinity of a position farthest from a position of the second target, the signal processor sets the first target as the output object with respect to the control apparatus of the host vehicle.

2. The radar apparatus according to claim 1, wherein in a case where a time during which (i) the fore-and-aft distance of the second target becomes a minimum among all sensed targets in the own lane and (ii) a lateral distance of the second target becomes a predetermined lateral distance or smaller, exceeds a predetermined time, the signal processor determines that the second target is present in the own lane.

3. The radar apparatus according to claim 1, wherein in a case where the first target is determined to be present in the own lane and not to be the accessory portion with respect to the second target in any one of a plurality of times of performance of a target detection process, the signal processor sets the first target as the output object with respect to the control apparatus of the host vehicle even though the first target subsequently has the been determined to be the accessory portion in the target detection process.

4. A vehicle control system comprising:
   a radar apparatus configured to set a first target to be a non-output object with respect to a control apparatus of a host vehicle in a case where the first target (1) has a fore-and-aft distance from the host vehicle that is larger than a fore-and-aft distance of a second target from the host vehicle and (2) has been determined to be an accessory portion which belongs to a same vehicle as the second target, the radar apparatus comprising a signal processor configured to:
      determine whether or not the second target is present in an own lane of the host vehicle;
      determine whether or not the second target is changing a lane; and
      set the first target, which previously had been determined to be the accessory portion which belongs to the same vehicle as the second target, to be an output object with respect to the control apparatus of the host vehicle and part of a different vehicle than the vehicle associated with the second target in a case where the second target is changing the lane from the own lane; and
   a control apparatus configured to control the host vehicle on the basis of target information on the periphery of the host vehicle derived by the radar apparatus,
   wherein in a case where the first target (i) is determined to be present within a determination range in which the presence or absence of the accessory portion is determined and (ii) is in a vicinity of a position farthest from a position of the second target, the signal processor sets the first target as the output object with respect to the control apparatus of the host vehicle.

5. A signal processing method that sets a first target to be a non-output object with respect to a control apparatus of a host vehicle in a case where the first target (1) has a fore-and-aft distance from the host vehicle that is larger than a fore-and-aft distance of a second target from the host vehicle and (2) has been determined to be an accessory portion which belongs to a same vehicle as the second target, the signal processing method comprising:
   (a) determining, with a signal processor, whether or not the second target is present in an own lane of the host vehicle;
   (b) determining, with the signal processor, whether or not the second target is changing a lane;
   (c) setting, with the signal processor, the first target, which previously had been determined to be the accessory portion which belongs to the same vehicle as the second target, to be an output object to the control apparatus of the host vehicle and part of a different vehicle than the vehicle associated with the second target in a case where the second target is changing the lane from the own lane; and (d) controlling the host vehicle with the control apparatus based on target information on the periphery of the host vehicle, the target information including information about the first target set in (c), wherein in a case where the first target (i) is determined to be present within a determination range in which the presence or absence of the accessory portion is determined and (ii) is in a vicinity of a position farthest from the position of the second target, the signal processor in (c) sets the first target as the output object with respect to the control apparatus of the host vehicle.

6. The signal processing method according to claim 5, wherein in a case where a time during which (i) the fore-and-aft distance of the second target becomes a minimum among all sensed targets in the own lane and (ii) a lateral distance of the second target becomes a predetermined lateral distance or smaller, exceeds a predetermined time, the signal processor in (a) determines that the second target is present in the own lane.

7. The signal processing method according to claim 5, wherein in a case where the first target is determined to be present in the own lane and not to be the accessory portion with respect to the second target in any one of a plurality of times of performance of a target detection process, the signal processor in (c) sets the first target as the output object with respect to the control apparatus of the host vehicle even though the first target subsequently has been determined to be the accessory portion in the target detection process.

* * * * *